US012756453B2

(12) United States Patent
Wang et al.

(10) Patent No.: US 12,756,453 B2
(45) Date of Patent: Oct. 6, 2026

(54) ADAPTIVE PHASE-CHANGING DEVICES FOR NON-TERRESTRIAL NETWORKS

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 357 days.

(21) Appl. No.: 18/572,599

(22) PCT Filed: Jul. 26, 2022

(86) PCT No.: PCT/US2022/074161
§ 371 (c)(1),
(2) Date: Dec. 20, 2023

(87) PCT Pub. No.: WO2023/015118
PCT Pub. Date: Feb. 9, 2023

(65) Prior Publication Data

US 2024/0372604 A1 Nov. 7, 2024

Related U.S. Application Data

(60) Provisional application No. 63/229,709, filed on Aug. 5, 2021.

(51) Int. Cl.
*H04B 7/185* (2006.01)
*H04B 5/00* (2024.01)
(Continued)

(52) U.S. Cl.
CPC ..... *H04B 7/18504* (2013.01); *H04B 7/18515* (2013.01); *H04L 5/0048* (2013.01); *H04W 72/1273* (2013.01)

(58) Field of Classification Search
CPC ............ H04B 7/18504; H04B 7/18515; H04L 5/0048; H04W 72/1273
See application file for complete search history.

(56) References Cited

U.S. PATENT DOCUMENTS 11,641,234 B2 * 5/2023 Hirai ................ H04B 10/25752 455/12.1
12,553,979 B2 * 2/2026 Harrebek ................ G01S 5/021
(Continued)

FOREIGN PATENT DOCUMENTS

CN 111684856 A 9/2020
CN 113068262 A 7/2021
(Continued)

OTHER PUBLICATIONS

"International Preliminary Report on Patentability", Application No. PCT/US2022/074161, Oct. 26, 2023, 10 pages.
(Continued)

*Primary Examiner* — Rasheed Gidado
(74) *Attorney, Agent, or Firm* — Colby Nipper PLLC

(57) ABSTRACT

In aspects, a high altitude platform station, HAPS, communicating with a user equipment, UE, using an adaptive phase-changing device, APD. The HAPS receives characteristics of the APD and selects the APD for inclusion in a wireless communication path with the UE based at least in part on the characteristics. The HAPS transmits a resource grant to the APD that includes an indication of air interface resources for an APD-Physical Downlink Control Channel, APD-PDCCH, between the HAPS and the APD, transmits, to the APD, an indication of phase vectors and timing information for a surface of the APD using the APD-PDCCH, and communicates with the UE using wireless transmissions that travel along the wireless communication path that includes the surface of the APD.

20 Claims, 9 Drawing Sheets

(51) Int. Cl.
*H04L 5/00* (2006.01)
*H04W 72/1273* (2023.01)

(56) References Cited

U.S. PATENT DOCUMENTS

| | | | | |
|---|---|---|---|---|
| 2018/0075746 | A1 | 3/2018 | Jiang et al. | |
| 2020/0095057 | A1 | 3/2020 | Conicella | |
| 2021/0266901 | A1* | 8/2021 | Zhu | H04W 72/0453 |
| 2022/0167342 | A1* | 5/2022 | Raghavan | G01S 5/0221 |
| 2023/0156804 | A1* | 5/2023 | Ye | H04W 74/0833 370/329 |
| 2024/0224317 | A1* | 7/2024 | Hsieh | H04B 7/18504 |

FOREIGN PATENT DOCUMENTS

| | | | |
|---|---|---|---|
| CN | 113133014 | A | 7/2021 |
| WO | 2021092746 | A1 | 5/2021 |
| WO | 2021236510 | | 11/2021 |
| WO | 2023015118 | | 2/2023 |

OTHER PUBLICATIONS

"International Preliminary Report on Patentability", Application No. PCT/US2022/074161, Oct. 26, 2023, 27 pages.
"International Search Report and Written Opinion", Application No. PCT/US2022/074161, Nov. 11, 2022, 12 pages.
"Written Opinion", Application No. PCT/US2022/074161, Jul. 6, 2023, 9 pages.
GE, et al., "Joint Beamforming and Trajectory Optimization for Intelligent Reflecting Surfaces-Assisted UAV Communications", Apr. 2020, 11 pages.
Wu, et al., "Intelligent Reflecting Surface-Aided Wireless Communications: A Tutorial", May 5, 2021, pp. 3313-3351.
"Foreign Office Action", CN Application No. 202280050114.X, Apr. 24, 2026, 25 pages.

* cited by examiner

| Surface-Configuration Codebook 608 | | | | |
|---|---|---|---|---|
| *Index* | *Configuration for Element 602* | *Configuration for Element 604* | *Configuration for Element 606* | . . . |
| 0 | Phase Configuration 0 | Phase Configuration 1 | Phase Configuration 2 | . . . |
| 1 | Phase Configuration 3 | Phase Configuration 4 | Phase Configuration 5 | . . . |
| 2 | . . . | . . . | . . . | . . . |

ADAPTIVE PHASE-CHANGING DEVICES FOR NON-TERRESTRIAL NETWORKS

RELATED APPLICATION(S)

This application is a national stage entry of International Application No. PCT/US2022/074161, filed Jul. 26, 2022, which claims the benefit of U.S. Provisional Application No. 63/229,709, filed Aug. 5, 2021, the disclosures of which are incorporated herein by reference in their entireties.

BACKGROUND

Non-terrestrial-based communication systems, such as satellite-based or aircraft-based communication systems, provide flexibility to end-users. To illustrate, a single satellite that acts as a relay can provide coverage to remote locations that are difficult to reach, such as mountainous or oceanic areas with limited accessibility.

While the higher frequency ranges for evolving non-terrestrial communication systems can be used to increase data capacity, transmitting and recovering information using these higher frequency ranges also poses challenges. The higher-frequency signals and MIMO (multiple input, multiple output) transmissions, for instance, are more susceptible to multipath fading and other types of path loss, which lead to recovery errors at a receiver. Obstructions (e.g., buildings, foliage, vehicles, weather) may prevent and/or block higher frequency transmissions from reaching an intended receiver. It, therefore, becomes desirable to correct for the signal distortions in order to obtain sustainable performance benefits (e.g., increased data capacity) provided by these approaches.

SUMMARY

In aspects, methods, devices, systems, and means for adaptive phase-changing devices for non-terrestrial networks describes a high altitude platform station (HAPS) communicating with a user equipment (UE) using an adaptive phase-changing device (APD). The HAPS receives characteristics of the APD and selects the APD for inclusion in a wireless communication path with the UE based at least in part on the characteristics. The HAPS transmits a resource grant to the APD that includes an indication of air interface resources for an APD-Physical Downlink Control Channel (APD-PDCCH) between the HAPS and the APD, transmits, to the APD, an indication of phase vectors and timing information for a reconfigurable reflective surface of the APD using the APD-PDCCH, and communicates with the UE using wireless transmissions that travel along the wireless communication path that includes the surface of the APD.

In aspects, methods, devices, systems, and means for adaptive phase-changing devices for non-terrestrial networks describes an adaptive phase-changing device (APD) that receives a resource grant from a high altitude platform station (HAPS) that includes an indication of scheduled air interface resources for an APD-Physical Downlink Control Channel (APD-PDCCH), between the HAPS and the APD. The APD receives an indication of phase vectors and timing information for a surface of the APD over the APD-PDCCH and configures the surface of the APD using the received indication of phase vectors and timing information to reflect wireless transmissions that travel along a wireless communication path, from the HAPS to a User Equipment (UE), that includes the surface of the APD.

The details of one or more implementations are set forth in the accompanying drawings and the following description. Other features and advantages will be apparent from the description, drawings, and examples described herein. This summary is provided to introduce subject matter that is further described in the Detailed Description and Drawings. Accordingly, this summary should not be considered to describe essential features nor used to limit the scope of the described subject matter.

BRIEF DESCRIPTION OF THE DRAWINGS

The details of one or more aspects of adaptive phase-changing devices for non-terrestrial networks are described below. The use of the same reference numbers in different instances in the description and the figures may indicate like elements.

DETAILED DESCRIPTION

A non-terrestrial network (NTN) can provide ubiquitous coverage for user equipment (UE) communications using non-terrestrial flying or floating communication platforms (e.g., satellite communication systems, an airborne vehicle platform, aircraft-based communication platforms, drone-based communication platforms). One of these non-terrestrial flying or floating communication platforms may be referred to as a High Altitude Platform Station (HAPS). Depending on hardware configuration, a HAPS can operate in higher frequency bands (e.g., above-6 GHz bands, Frequency Range 2, millimeter wave (mm Wave) bands that are defined by one or more of the 3GPP LTE, 5G NR, or 6G communication standards such as 26 GHZ, 28 GHZ, 38 GHZ, 39 GHz, 41 GHZ, 57-64 GHZ, 71 GHz, 81 GHz, 92 GHz bands, 100 GHz to 300 GHz, 130 GHz to 175 GHz, or 300 GHz to 3 THz bands). Communications between a HAPS and a UE using these higher frequency bands may encounter line-of-sight challenges that impair communications. For example, a UE may experience blocking of communications with a HAPS from a fixed object, such as a high-rise building, or from a moving object, such as a cloud. With recent advancements in adaptive phase-changing devices (APDs), new approaches may be available to improve quality and/or reliability of communication services provided by non-terrestrial-based communication systems.

While features and concepts of the described systems and methods for adaptive phase-changing devices for non-terrestrial networks can be implemented in any number of different environments, systems, devices, and/or various configurations, various aspects of adaptive phase-changing devices for non-terrestrial networks are described in the context of the following example devices, systems, and configurations.

Operating Environment

Figure 1:
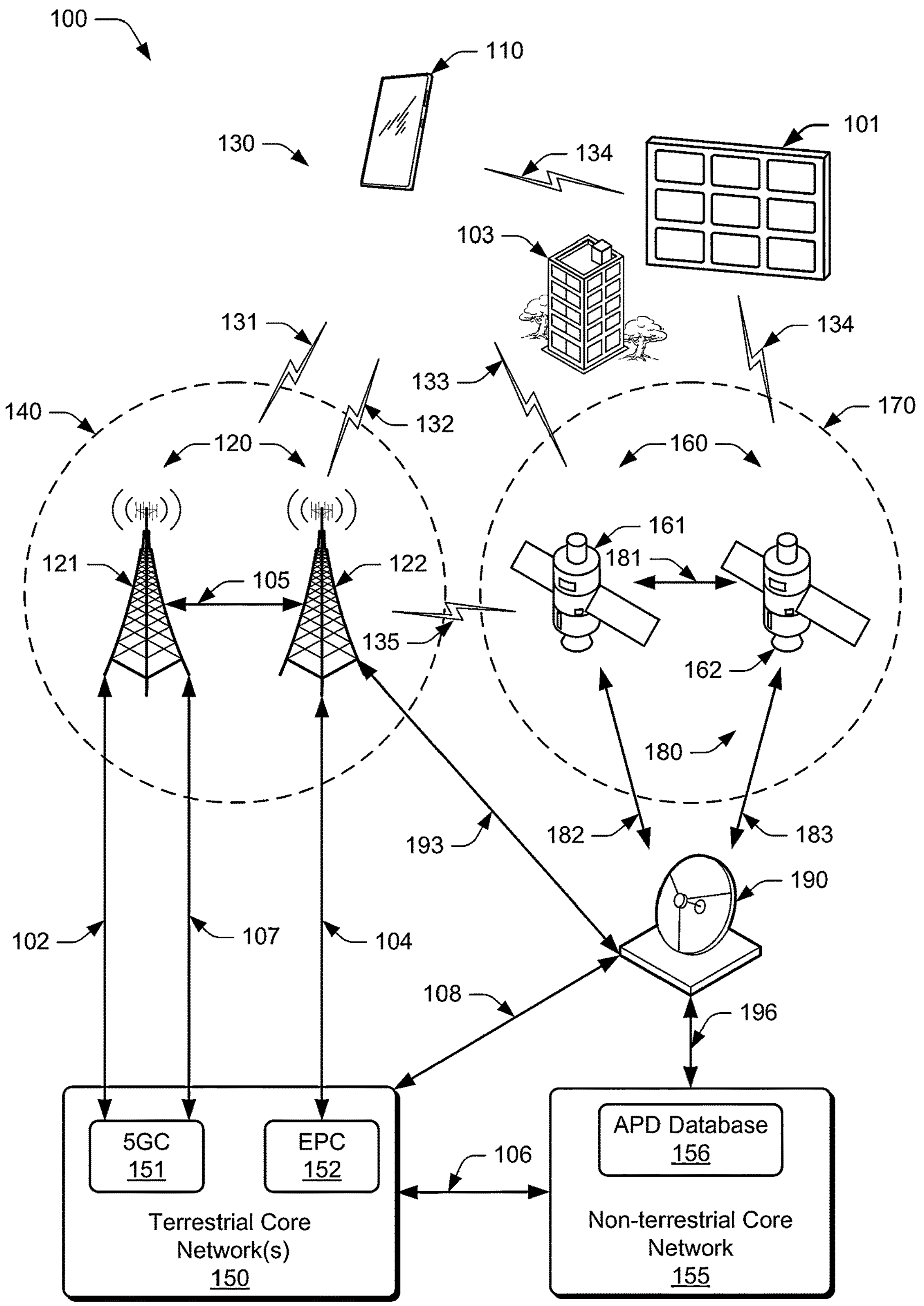
FIG. 1 illustrates an example environment that can be used in accordance with various aspects of adaptive phase-changing devices for non-terrestrial networks.

FIG. 1 illustrates an example environment 100, which includes a user equipment 110 (UE 110) that can communicate with terrestrial base stations 120 (illustrated as terrestrial base stations 121 and 122) through one or more wireless communication links 130 (wireless links 130), generally illustrated as wireless link 131 and wireless link 132. Alternatively or additionally, the UE 110 can communicate with one or more non-terrestrial communication platforms, illustrated as HAPSs 160 (e.g., HAPS 161 and HAPS 162) through one or more of the wireless links 130, generally illustrated as wireless link 133 and wireless link 134. The UE 110 can communicate directly with a HAPS as illustrated by wireless link 133 or the UE 110 can communicate with the HAPS by reflecting signals of the wireless link 134 using an APD 101 around a blockage 103.

For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The terrestrial base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base station, and the like, or any combination thereof.

The terrestrial base stations 120 communicate with the UE 110 using the wireless links 131 and/or 132, which may be implemented as any suitable type of wireless link. Similarly, the HAPS 160 communicate with the UE 110 using the wireless links 133 and/or 134. At times, the terrestrial base stations 120 communicate with the HAPSs 160 using the wireless link 135. The wireless links 131, 132, 133, 134, and/or 135 include control-plane signaling and/or user-plane data, such as downlink of user-plane data and control-plane information communicated from the terrestrial base stations 120 to the UE 110, downlink of user-plane data and control-plane information from the HAPSs 160 to the UE 110, uplink of other user-plane data and control-plane information communicated from the UE 110 to the terrestrial base stations 120, uplink of other user-plane data and control-plane signaling communicated from the UE 110 to the HAPSs 160, downlink and uplink communications between a base station and a HAPS, or any combination thereof. The wireless links 130 may include one or more wireless links (e.g., radio links) or bearers implemented using any suitable communication protocol or standard, or combination of communication protocols or standards, such as Third Generation Partnership Project Long-Term Evolution (3GPP LTE), Fifth Generation New Radio (5G NR), Mobile Satellite Service (MSS), and future evolutions. In various aspects, the base stations 120 and UE 110 may be implemented for operation in sub-gigahertz bands, sub-6 GHz bands (e.g., Frequency Range 1), and/or above-6 GHz bands (e.g., Frequency Range 2, millimeter wave (mmWave) bands) that are defined by one or more of the 3GPP LTE, 5G NR, or 6G communication standards. Multiple wireless links 130 may be aggregated using a carrier aggregation or multi-connectivity technology to provide a higher data rate for the UE 110. Multiple wireless links 130 from multiple terrestrial base stations 120 or HAPS 160 may be configured for Coordinated Multipoint (CoMP) or Dual Connectivity (DC) communication with the UE 110.

The terrestrial base stations 120 form a first wireless communication network, such as a Radio Access Network 140 (e.g., RAN, Evolved Universal Terrestrial Radio Access Network, E-UTRAN, 5G NR RAN, NR RAN), where the RAN 140 communicates with one or more terrestrial core networks 150 (core network 150). To illustrate, the terrestrial base station 121 connects, at interface 102, to a 5G core network 151 (5GC 151) through an NG2 interface for control-plane signaling and using an NG3 interface for user-plane data communications. The terrestrial base station 122 connects, at interface 104, to an Evolved Packet Core 152 (EPC 152) using an SI interface for control-plane signaling and user-plane data communications. Alternatively, or additionally, the terrestrial base station 122 connects to the 5GC 151 using an NG2 interface for control-plane signaling and through an NG3 interface 107 for user-plane data communications. Accordingly, certain terrestrial base stations 120 can communicate with multiple wireless core networks 150 (e.g., the 5GC 151, the EPC 152).

In addition to connections with core networks, the terrestrial base stations 120 may communicate with each other. For example, the terrestrial base stations 121 and 122 communicate through an Xn interface at interface 105. In some aspects, a terrestrial base station 120 coordinates with a HAPS 160 through the wireless link 135 and/or through the connection to the terrestrial core network(s) 150. As another example, a terrestrial core network 150 coordinates with a non-terrestrial core network 155 through an interface 106 as further described.

The HAPSs 160 form a second wireless communication network, generally labeled in the environment 100 as a non-terrestrial access network 170 (NTN 170). In aspects, the UE 110 communicates with the HAPSs using the wireless links 133 and/or 134 that can be implemented using a common radio-access technology (RAT) used to communicate with the terrestrial base stations 120 and/or an NTN RAT different from RATs used to communicate with the terrestrial base stations 120. As one example, the RAT used to communicate with the HAPSs 160 may operate in accordance with frequencies and protocols associated with a Mobile Satellite Service (MSS) or the like. Alternatively or additionally, the UE 110 communicates with the HAPSs 160 using one or more RATs used to communicate with the terrestrial base stations 120, such as LTE, 5G NR, 6G communications, and so forth.

Generally, the HAPS 161 and HAPS 162 represent non-terrestrial communication platforms and may be, for example, a low earth orbit (LEO) satellite, a medium earth orbit (MEO) satellite, a geostationary earth orbit (GEO)

satellite, highly elliptical orbiting (HEO) satellite, a high-altitude communication platform, an airborne vehicle platform, or an uncrewed aerial vehicle-(UAV-) based communication platform. The HAPS 161 and the HAPS 162 can include on-board processing to implement base station functionality (e.g., a gNode B, a Distributed Unit (DU)) and/or implement a bent-pipe architecture in which the HAPS acts as a transponder relay. The HAPS 161 and the HAPS 162 communicate with elements of the NTN 170 by way of one or more interfaces 180 (illustrated as interface 181, interface 182, and interface 183). Interface 181 supports an inter-HAPS link (such as an inter-satellite link (ISL)) connecting HAPS 161 and HAPS 162 and may be, for example, an optical interface, a laser interface, or a radio-frequency (RF) interface. Interfaces 182 and 183 support gateway links (GWLs) connecting HAPS 161 and HAPS 162, respectively, to a non-terrestrial core network 155, such as through one or more ground stations 190 (e.g., remote radio units (RRUs)) and interface 196. The non-terrestrial core network 155 can include and/or communicate with any combination of ground stations (e.g., ground stations 190), servers, routers, switches, control elements, and the like. The ground station 190 can alternatively or additionally be referred to as a non-terrestrial base station. As shown, the non-terrestrial core network 155 communicates with the terrestrial core network 150 through an interface 106 and the ground station 190 through the interface 196 (e.g., N1, N2, and/or N3 interface). In different configurations, however, a ground station 190 may connect to a terrestrial core network through interface 108 (e.g., N1, N2, and/or N3 interface) or to a base station 120 through a different interface 193 (illustrated generally in FIG. 1 as an interface to base station 122).

The non-terrestrial core network 155 may include an APD database 156. The APD database 156 stores the characteristics of APDs that are available to the NTN. The APD database 156 associates the characteristics of each APD with a unique identifier of the respective APD. The characteristics include a geographic location of the APD, an orientation of the APD, a minimum time for setting a new reconfigurable intelligent surface (RIS) configuration of the APD, incident and reflective angular ranges of the APD, ability to subdivide the array of multiple configurable surface elements of the RIS panel to enable multiple UEs to communicate with the NTN using the RIS panel, and how much the array of multiple configurable surface elements of the RIS panel can be subdivided, and the like. The unique identifier of each APD may be a statically-assigned APD-RNTI or another unique identifier, such as an identifier of the APD assigned when the APD was installed. Alternatively, the APD database 156 may be included in the terrestrial core network 150 and accessed from the NTN via the interface 106.

Example Devices

Figure 2:
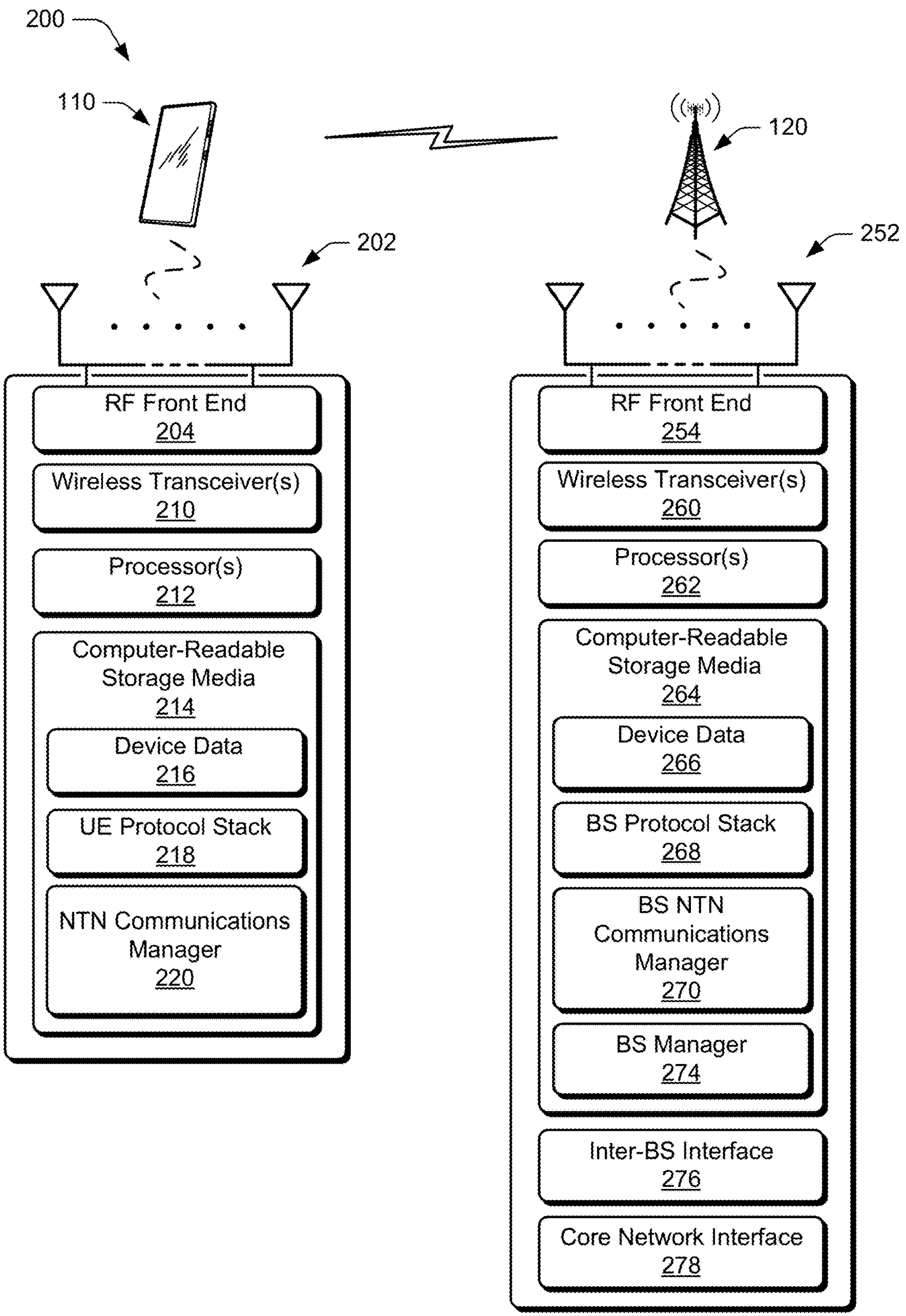
FIG. 2 illustrates an example device diagram of entities that can implement various aspects of adaptive phase-changing devices for non-terrestrial networks.

FIG. 2 illustrates an example device diagram 200 of the UE 110 and one of the base stations 120 that can implement various aspects of adaptive phase-changing devices for non-terrestrial networks. The UE 110 and/or the base station 120 may include additional functions and interfaces that are omitted from FIG. 2 for the sake of clarity.

The UE 110 includes antennas 202, a radio frequency front end 204 (RF front end 204), and one or more wireless transceivers 210 (e.g., an LTE transceiver, a 5G NR transceiver, and/or a 6G transceiver) for communicating with the base station 120 in the RAN 140 and/or the HAPS 160 in the NTN 170. The RF front end 204 of the UE 110 can couple or connect the wireless transceiver(s) 210 to the antennas 202 to facilitate various types of wireless communication. The antennas 202 of the UE 110 may include an array of multiple antennas that are configured in a manner similar to or different from each other. The antennas 202 and the RF front end 204 can be tuned to, and/or be tunable to, one or more frequency bands defined by the 3GPP LTE, 5G NR, 6G communication standards, and/or various satellite frequency bands, and implemented by the wireless transceiver 210. In some aspects, the satellite frequency bands overlap with the 3GPP LTE-defined, 5G NR-defined, and/or 6G-defined frequency bands. Additionally, the antennas 202, the RF front end 204, and/or the wireless transceiver 210 may be configured to support beamforming for the transmission and reception of communications with the base station 120 and/or the HAPS 160. By way of example and not limitation, the antennas 202 and the RF front end 204 can be implemented for operation in sub-gigahertz (GHz) bands, sub-6 GHz bands, and/or above 6 GHz bands that are defined by the 3GPP LTE, 5G NR, 6G, and/or NTN communications (e.g., NTN or satellite frequency bands).

The UE 110 also includes processor(s) 212 and computer-readable storage media 214 (CRM 214). The processor 212 may be a single-core processor or a multiple-core processor composed of a variety of materials, for example, silicon, polysilicon, high-K dielectric, copper, and so on. The term "computer-readable storage media" described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory useable to store device data 216 of the UE 110. The device data 216 can include user data, sensor data, control data, automation data, multimedia data, beamforming codebooks, applications, and/or an operating system of the UE 110, some of which are executable by processor(s) 212 to enable user-plane data, control-plane information, and user interaction with the UE 110.

The CRM 214 of the UE 110 includes the UE protocol stack 218. The UE protocol stack 218 may be implemented in whole or part as hardware logic or circuitry integrated with or separate from other components of the UE 110. The UE protocol stack 218 may implement any suitable type of communication protocol, such as in a manner similar to the example wireless network stack model 500 described with reference to FIG. 5.

The CRM 214 of the UE 110 includes an NTN communications manager 220. The NTN communications manager 220 may be implemented in whole or part as hardware logic or circuitry integrated with or separate from other components of the UE 110. While shown separate in the diagram 200, some implementations include portions or all functionality provided by the UE NTN communications manager 220 within the UE protocol stack 218. In other aspects, the NTN communications manager 220 enables repetitive communication across multiple bandwidth parts, utilizes HAPS information for UE mobility operations, or implements UE-side aspects of flexible band pairing.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The nomenclature for this distributed base station functionality varies and includes terms such as Central Unit (CU), Distributed Unit (DU), Baseband Unit (BBU), Remote Radio Head (RRH), a Radio Unit (RU), and/or Remote Radio Unit (RRU). The base station 120 includes antennas 252, a radio frequency front end 254 (RF front end 254), one or more wireless transceivers 260 (e.g., one or more LTE transceivers, one or more 5G NR transceivers, and/or one or more 6G transceivers) for communicating with the UE 110 and/or the HAPSs 160. The RF front end 254 of the base station 120 can couple or connect the wireless transceivers 260 to the antennas 252 to facilitate various types of wireless communication. The antennas 252 of the base station 120 may include an array of multiple antennas that are configured in a manner similar to, or different from, each other. The antennas 252 and the RF front end 254 can be tuned to, and/or be tunable to, one or more frequency bands defined by the 3GPP LTE, 5G NR, 6G communication standards, and/or various HAPS (satellite) frequency bands, and implemented by the wireless transceivers 260. Additionally, the antennas 252, the RF front end 254, and the wireless transceivers 260 may be configured to support beamforming (e.g., Massive multiple-input, multiple-output (Massive-MIMO)) for the transmission and reception of communications with the UE 110 and/or the HAPSs 160.

The base station 120 also includes processor(s) 262 and computer-readable storage media 264 (CRM 264). The processor 262 may be a single-core processor or a multiple-core processor composed of a variety of materials, for example, silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base station 120. The device data 266 can include network scheduling data, radio resource management data, beamforming codebooks, applications, and/or an operating system of the base station 120, which are executable by processor(s) 262 to enable communication with the UE 110 and/or the HAPS 160.

The CRM 264 includes a base station protocol stack 268 (BS protocol stack 268). The BS protocol stack 268 may be implemented in whole or part as hardware logic or circuitry integrated with or separate from other components of the base station 120. The BS protocol stack 268 may implement any suitable type of communication protocol, such as in a manner similar to the example wireless network stack model 500 described with reference to FIG. 5.

The CRM 264 optionally includes a base station NTN communications manager 270 (BS NTN communications manager 270). The BS NTN communications manager 270 may be implemented in whole or part as hardware logic or circuitry integrated with or separate from other components of the base station 120. While shown separate in the diagram 200, some implementations include portions or all functionality provided by the BS NTN communications manager 270 within the BS protocol stack 268. In some aspects, the BS NTN communications manager 270 manages communications and/or coordination with non-terrestrial communication systems. To illustrate, the BS NTN communications manager 270 manages communications with a HAPS 160 (and/or performs other operations and/or analysis). Alternatively or additionally, the BS NTN communications manager may implement aspects of repetitive communication, flexible frequency band assignment, and/or HAPS information for UEs.

The CRM 264 of the base station 120 also includes a base station manager 274 (BS manager 274), which may control various functionalities of the base station 120. Alternatively or additionally, the BS manager 274 may be implemented in whole or in part as hardware logic or circuitry integrated with, or separate from, other components of the base station 120. In at least some aspects, the BS manager 274 configures the wireless transceivers 260 for communication with the UE 110, the HAPS 160, and/or core network(s) (e.g., the terrestrial core network 150, the non-terrestrial core network 155). The base station 120 also includes an inter-base station interface 276, such as an Xn and/or X2 interface, which the base station manager configures to exchange user-plane data, control-plane information, and/or other data/information between other base stations, to manage the communication of the base station 120 with the UE 110 and/or the HAPSs 160. The base station 120 includes a core network interface 278 that the base station manager 274 configures to exchange user-plane data, control-plane information, and/or other data/information with core network functions and/or entities.

Figure 3:
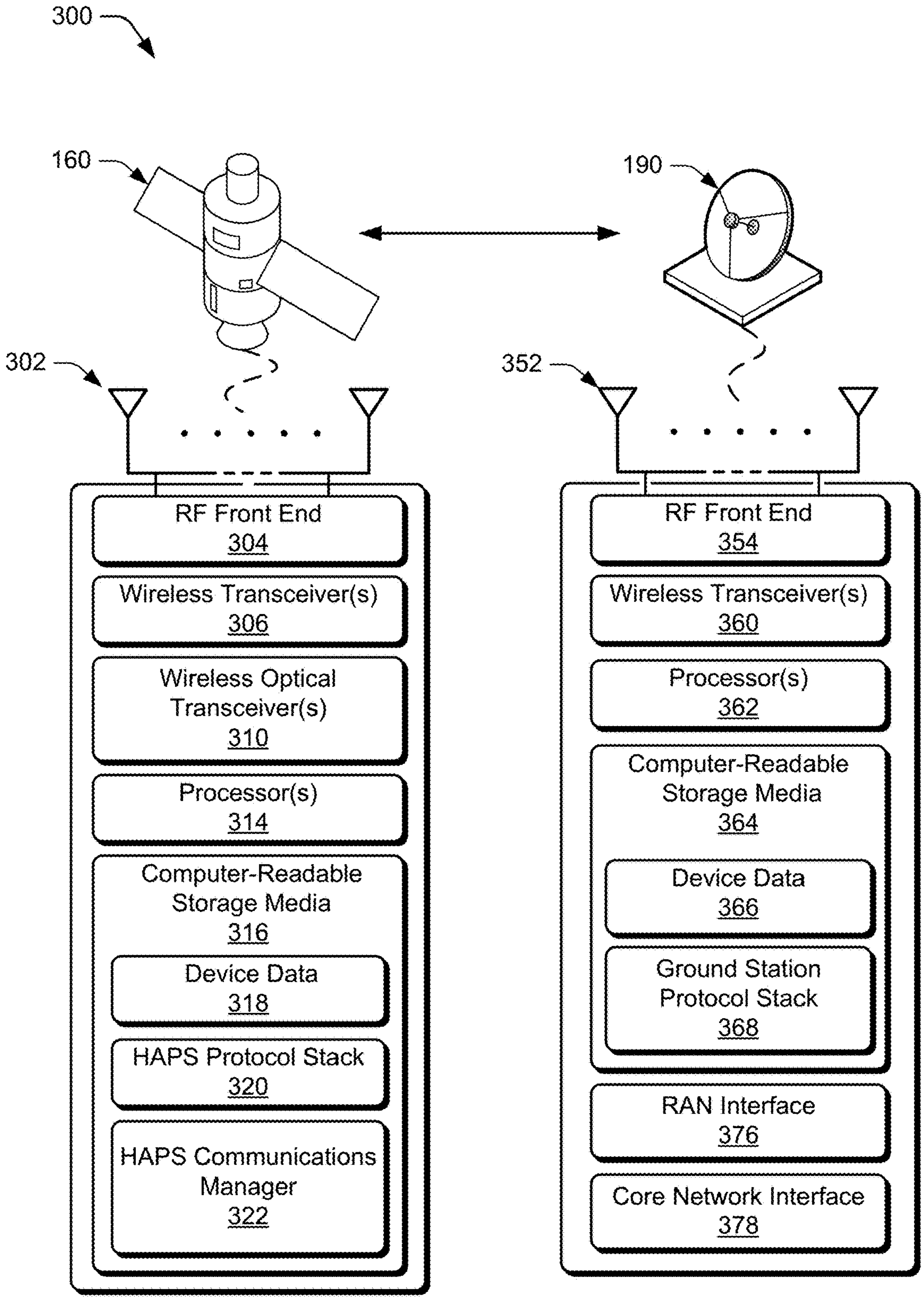
FIG. 3 illustrates an example device diagram of entities that can implement various aspects of adaptive phase-changing devices for non-terrestrial networks.

FIG. 3 illustrates an example device diagram 300 of the HAPS 160 and the ground station 190 (sometimes called a non-terrestrial base station) that can implement various aspects of adaptive phase-changing devices for non-terrestrial networks. The HAPS 160 and the ground station 190 may include additional functions and interfaces that are omitted from FIG. 3 for the sake of visual clarity.

The HAPS 160 can include on-board processing to implement a single network node (e.g., a gNode B). Alternatively or additionally, the HAPS 160 implements distributed base station functionality, such as a Distributed Unit (DU), that communicates with a Central Unit (CU) at the ground station 190. In some aspects, the HAPS 160 implements a bent-pipe architecture in which the HAPS acts as a transponder relay for the ground station 190. The HAPS 160 includes one or more antenna(s) 302, a radio frequency front end 304 (RF front end 304), and one or more wireless transceivers 306 for wirelessly communicating with the base station 120, the UE 110, another HAPS 160, and/or the ground station 190.

The antenna(s) 302 of the HAPS 160 may include an array of multiple antennas that are configured in a manner similar to or different from each other. Additionally, the antennas 302, the RF front end 304, and the transceiver(s) 306 may be configured to support beamforming for the transmission and reception of communications with the base stations 120, the UE 110, another HAPS 160, and/or the non-terrestrial core network 155. By way of example and not limitation, the antennas 302 and the RF front end 304 can be implemented for operation in sub-gigahertz bands, sub-6 GHz bands, and/or above 6 GHz bands. To illustrate, the antennas 302 and the RF front end 304 can be implemented for operation in any combination of satellite frequency bands. Thus, the antenna 302, the RF front end 304, and the transceiver(s) 306 provide the HAPS 160 with an ability to receive and/or transmit communications with the base station 120, the UE 110, another HAPS 160, and/or the non-terrestrial core network 155.

The HAPS 160 optionally includes one or more wireless optical transceiver 310 (wireless optical transceiver(s) 310) that can be used to communicate with other devices. To illustrate, a first instance of the HAPS 160 communicates with a second instance of the HAPS 160 using the wireless optical transceiver 310 as part of the interface 181.

The HAPS 160 includes processor(s) 314 and computer-readable storage media 316 (CRM 316). The processor 314 may be a single-core processor or a multiple-core processor implemented with a homogenous or heterogeneous core-structure. The computer-readable storage media described herein excludes propagating signals. CRM 316 may include any suitable memory or storage device such as RAM, SRAM, DRAM, NVRAM, ROM, or Flash memory useable to store device data 318 of the HAPS 160. The device data 318 includes user data, multimedia data, applications, and/or an operating system of the HAPS 160, which are executable by processor(s) 314 to enable various aspects of adaptive phase-changing devices for non-terrestrial networks as further described.

In aspects of adaptive phase-changing devices for non-terrestrial networks, the CRM 316 of the HAPS 160 includes a HAPS protocol stack 320. The HAPS protocol stack 320 may be implemented in whole or part as hardware logic or circuitry integrated with or separate from other components of the HAPS 160. The HAPS protocol stack 320 may implement any suitable type of communication protocol, such as in a manner similar to the example wireless network stack model 500 described with reference to FIG. 5.

The CRM 316 includes a HAPS communications manager 322. The HAPS communications manager 322 may be implemented in whole or part as hardware logic or circuitry integrated with or separate from other components of the HAPS 160. While shown separate in the diagram 300, some implementations include portions or all functionality provided by the HAPS communications manager 322 within the HAPS protocol stack 320.

The device diagram for the ground station 190, shown in FIG. 3, can implement a single network node (e.g., a gNode B). At times, the functionality of the ground station 190 may be distributed across multiple network nodes or devices and may be distributed in any fashion suitable to perform the functions described herein. The nomenclature for this distributed base station functionality varies and includes terms such as Central Unit (CU), Distributed Unit (DU), Baseband Unit (BBU), Remote Radio Head (RRH), a Radio Unit (RU), and/or Remote Radio Unit (RRU). The ground station 190 includes antennas 352, a radio frequency front end 354 (RF front end 354), one or more wireless transceivers 360 (e.g., one or more LTE transceivers, one or more 5G NR transceivers, and/or one or more 6G transceivers) for communicating with the HAPS 160. The RF front end 354 of the ground station 190 can couple or connect the wireless transceivers 360 to the antennas 352 to facilitate various types of wireless communication. The antennas 352 of the ground station 190 may include an array of multiple antennas that are configured in a manner similar to, or different from, each other. The antennas 352 and the RF front end 354 can be tuned to, and/or be tunable to, one or more satellite frequency bands and/or frequency bands defined by the 3GPP LTE, 5G NR, 6G communication standards, and/or various satellite frequency bands, and implemented by the wireless transceivers 360. Additionally, the antennas 352, the RF front end 354, the wireless transceivers 360 may be configured to support beamforming (e.g., Massive multiple-input, multiple-output (Massive-MIMO)) for the transmission and reception of communications with the HAPS 160.

The ground station 190 also includes processor(s) 362 and computer-readable storage media 364 (CRM 364). The processor 362 may be a single-core processor or a multiple-core processor composed of a variety of materials, for example, silicon, polysilicon, high-K dielectric, copper, and so on. CRM 364 may include any suitable memory or storage device such as random-access memory (RAM), static RAM (SRAM), dynamic RAM (DRAM), non-volatile RAM (NVRAM), read-only memory (ROM), or Flash memory useable to store device data 366 of the ground station 190. The device data 366 include network scheduling data, radio resource management data, beamforming codebooks, applications, and/or an operating system of the HAPS 160.

The CRM 364 includes a ground station protocol stack 368. The ground station protocol stack 368 may be implemented in whole or part as hardware logic or circuitry integrated with or separate from other components of the ground station 190. The ground station protocol stack 368 may implement any suitable type of communication protocol, such as in a manner similar to the example wireless network stack model 500 described with reference to FIG. 5. The ground station 190 may include a radio access network interface 376 (RAN interface 376) to implement interface 193 to one or more of the base stations 120. In aspects, the RAN interface 376 is analogous to an Xn or X2 interface between terrestrial base stations. The ground station may also include a core network interface 378 to implement interface 196 or 108 that enables the ground station to communicate with the core network of the non-terrestrial network or communicate with a terrestrial core network.

Figure 4:
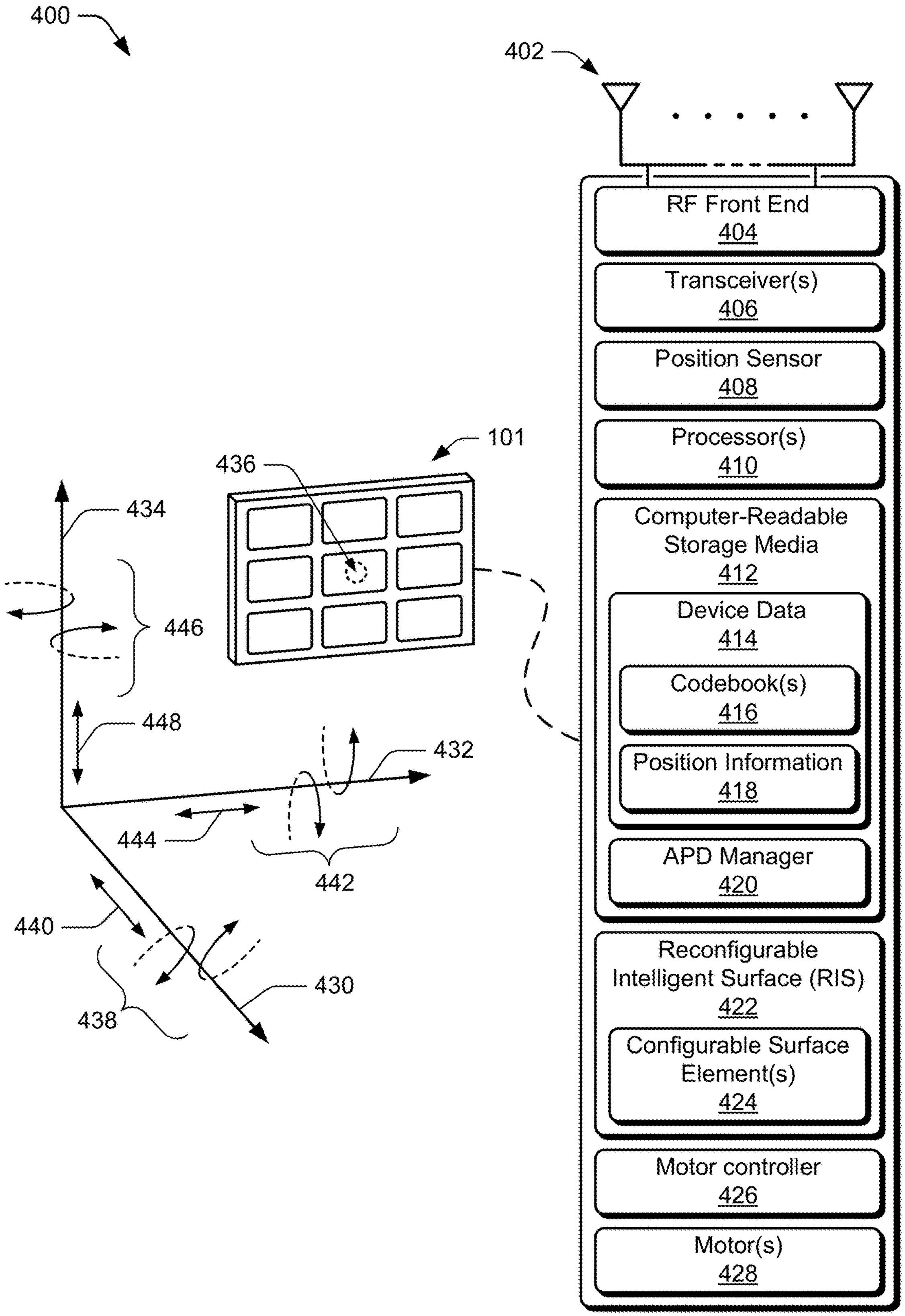
FIG. 4 illustrates an example device diagram of entities that can implement various aspects of adaptive phase-changing devices for non-terrestrial networks.

FIG. 4 illustrates an example device diagram 400 of the APD 101. Generally, the device diagram 400 describes an example entity with which various aspects of adaptive phase-changing devices for non-terrestrial networks can be implemented but may include additional functions and interfaces that are omitted from FIG. 4 for the sake of visual clarity. The APD 101 includes one or more antenna(s) 402, a radio frequency front end 404 (RF front end 404), and one or more radio-frequency transceivers 406 for wirelessly communicating with the base station 120, the HAPS 160, and/or the UE 110. The APD 101 can also include a position sensor 408, such as a Global Navigation Satellite System (GNSS) module, that provides position information based on a location of the APD 101.

The antenna(s) 402 of the APD 101 may include an array of multiple antennas that are configured in a manner similar to or different from each other. Additionally, the antennas 402, the RF front end 404, and the transceiver(s) 406 may be configured to support beamforming for the transmission and reception of communications with the base stations 120 and/or the HAPS 160. By way of example and not limitation, the antennas 402 and the RF front end 404 can be implemented for operation in sub-gigahertz bands, sub-6 GHz bands, above 6 GHz bands, and/or satellite bands. Thus, the antenna 402, the RF front end 404, and the transceiver(s) 406 provide the APD 101 with an ability to receive and/or transmit communications with the UE 110, the base station 120 and/or the HAPS 160, such as information transmitted using the wireless link 134 as further described.

The APD 101 includes processor(s) 410 and computer-readable storage media 412 (CRM 412). The processor 410 may be a single-core processor or a multiple-core processor implemented with a homogenous or heterogeneous core-structure. The computer-readable storage media described herein excludes propagating signals. CRM 412 may include any suitable memory or storage device such as RAM, SRAM, DRAM, NVRAM, ROM, or Flash memory useable to store device data 414 of the APD 101. The device data 414 includes applications and/or an operating system of the APD 101, which are executable by processor(s) 410 to enable dynamic configuration of the APD 101 as further described. The device data 414 also includes one or more codebooks 416 of any suitable type or combination and position information 418 of the APD 180. The position information 418 may be obtained or configured using the position sensor 408 or programmed into the APD 101, such as during installation. The position information 418 indicates a position of the APD 101 and may include a location, geographic coordinates, orientation, elevation information, or the like. A HAPS 160, by way of a HAPS Communications manager 322, can use the position information 418 in computing angular or distance information, such as between the HAPS 160 and APD 101 and/or between the APD 101 and a UE 110 of interest. The codebooks 416 can include surface-configuration codebooks that store surface-configuration information for a RIS of an APD and beam-sweeping codebooks that store patterns, sequences, or timing information (e.g., phase vectors and reflection identifiers) for implementing multiple surface-configurations useful to direct an APD to perform a variety of reflective beamforming. In some aspects, the surface-configuration codebooks and beam-sweeping codebooks include phase-vector information, angular information (e.g., calibrated to respective phase vectors), and/or beam-configuration information.

The CRM 412 of the APD 101 includes an adaptive phase-changing device manager 420 (APD manager 420). Alternatively or additionally, the APD manager 420 may be implemented in whole or part as hardware logic or circuitry integrated with or separate from other components of the APD 101. Generally, the APD manager 420 manages a surface configuration of the APD 101, such as by processing information exchanged with a base station over wireless link 134 and using the information to configure a reconfigurable intelligent surface 422 (RIS 422) of the APD 101. To illustrate, the APD manager 420 receives an indication of a surface configuration over the wireless link 134 (an APD control channel), extracts the surface configuration from the codebooks 416 using the indication, and applies the surface configuration to the RIS 422. Alternatively or additionally, the APD manager 420 initiates the transmission of uplink messages to the base station or the HAPS over the wireless links 134, such as acknowledgments/negative acknowledgments (ACKs/NACKs) for various APD configuration or management commands. In some aspects, the APD manager 420 receives an indication of a beam-sweeping pattern (e.g., beam-sweeping pattern index) over the wireless link 134 and applies a sequence of various surface configurations to the RIS based on the beam-sweeping pattern and/or in accordance with a synchronization or pattern timing indicated by or received with the indication.

The RIS 422 of the APD 180 includes one or more configurable surface element(s) 424, such as configurable electromagnetic elements, configurable resonator elements, or configurable reflectarray antenna elements. Generally, the configurable surface elements 424 can be selectively or programmatically configured to control how the RIS 422 reflects (e.g., directionality) and/or transforms incident waveforms. By way of example and not of limitation, configurable electromagnetic elements include scattering particles that are connected electronically (e.g., through PIN diodes). Implementations use the electronic connection to arrange the scattering particles, such as based on principles of reflection, to control a directionality, phase, amplitude, and/or polarization of the transformed waveform (from the incident waveform). The RIS 422 can include array(s) of configurable surface element(s) 424, where an array can include any number of elements having any size. As discussed below, the APD uses a guard period between receiving control information and reflecting signals to provide time to reconfigure the RIS 422.

In one aspect, the RIS 422 is configured as an antenna to receive APD-Physical Downlink Control Channel (APD-PDCCH) transmissions from a HAPS. For example, the RIS 422 is coupled to the RF front end 404 and/or the transceivers 406 to receive control channel information using the APD-PDCCH and in turn using the received control channel information (e.g., phase vector and timing information) to configure the RIS 422 to reflect communications between the HAPS and the UE.

In some aspects, a position and/or orientation of the APD 101 is configurable, and the APD 101 includes a motor controller 426 communicating with one or more motor(s) 428 that are operably coupled with a physical chassis of the APD 101. Based on command and control information, such as received from a HAPS 160 or a base station 120, the motor controller 426 can send commands to the motors 428 that alter one or more kinematic behaviors of the motors 428, which may include any suitable type of stepper motor or servo. For example, the motor controller 426 may issue commands or control signals that specify a shaft rotation of a stepper motor in degrees, a shaft-rotation rate of a stepper motor in revolutions per minute (RPM), a linear movement of a linear motor millimeters (mm), a linear velocity of a linear motor in meters/second (m/s). The one or more motors 428, in turn, may be linked to mechanisms that mechanically position the physical chassis or a platform (e.g., avionics of a drone, a drive of a linear rail system, a gimble within a base station, a linear bearing within a base station) supporting the APD 101. Through the commands and signals that the motor controller 426 generates and sends to the motors 428, a physical position, location, or orientation of the APD 101 (and/or the platform supporting the APD 101) may be altered. In response to receiving a position configuration from a base station or HAPS, the APD manager 420 communicates movement commands to the motor controller 426, such as through a software interface and/or hardware addresses, based on the position configuration. A base station 120 or the HAPS 160 may reposition or reorient one or more APDs 101 to improve or enable wireless signal reflections to be directed to the UE 110.

Generally, the APD 101 can include multiple motors, where each motor corresponds to a different rotational or linear direction of movement. Examples of motor(s) 428 that can be used to control orientation and location of the APD include linear servo motors that might be part of a (i) rail system mounting for the APD, (ii) motors controlling a direction and pitch, yaw, roll of a drone carrying the APD, (iii) radial servo or stepper motors that rotate an axis if the APD is in a fixed position or on a gimbal, and so on. For clarity, the motor controller 426 and the motors 428 are illustrated as being a part of the APD 101, but in alternative or additional implementations, the APD 101 communicates with motor controllers and/or motors external to the APD. To illustrate, the APD manager 420 communicates a position configuration to a motor controller that mechanically positions a platform or chassis that supports the APD 101. In aspects, the APD manager 420 communicates the position configuration to the motor controller using a local wireless link, such as Bluetooth® Zigbee™, IEEE 802.15.4, or a hardwire link. The motor controller then adjusts the platform based on the position configuration using one or more motors. The platform can correspond to, or be attached to, any suitable mechanism that supports rotational and/or linear adjustments, such as a drone, a rail-propulsion system, a hydraulic lift system, and so forth.

As shown in FIG. 4, a position of the APD 101 may be defined with respect to a three-dimensional coordinate system in which an X-axis 430, Y-axis 432, and Z-axis 434 define a spatial area and provide a framework for indicating a position configuration through rotational and/or linear adjustments. While these axes are generally labeled as the X-axis, Y-axis, and Z-axis, other frameworks can be utilized to indicate the position configuration. To illustrate, aeronautical frameworks reference the axes as vertical (yaw), lateral (pitch), and longitudinal (roll) axes, while other movement frameworks reference the axes as vertical, sagittal, and frontal axes. As one example, position 436 generally points to a center position of the APD 101 that corresponds to a baseline position (e.g., position (0,0,0) using XYZ coordinates).

In aspects, the APD manager 420 communicates a rotational adjustment (e.g., rotational adjustments 438) around the X-axis 430 to the motor controller 426, where the rotational adjustment includes a rotational direction (e.g., clockwise or counterclockwise), an amount of rotation (e.g., degrees), and/or a rotation velocity. Alternatively or additionally, the APD manager 420 communicates a linear adjustment 440 along the X-axis, where the linear adjustment includes any combination of a direction, a velocity, and/or a distance of the adjustment. At times, the APD manager 420 communicates adjustments around the other axes as well, such as any combination of rotational adjustments 442 around the Y-axis 432, linear adjustments 444 along the Y-axis 432, rotational adjustments 446 around the Z-axis 434, and/or linear adjustments 448 along the Z-axis 434. Thus, the position configuration can include combinations of rotational and/or linear adjustments in all three degrees of spatial freedom. This allows the APD manager 420 to communicate physical adjustments to the APD 101. Alternatively or additionally, the APD manager communicates RIS surface configurations as further described.

Example Protocol Stack

Figure 5:
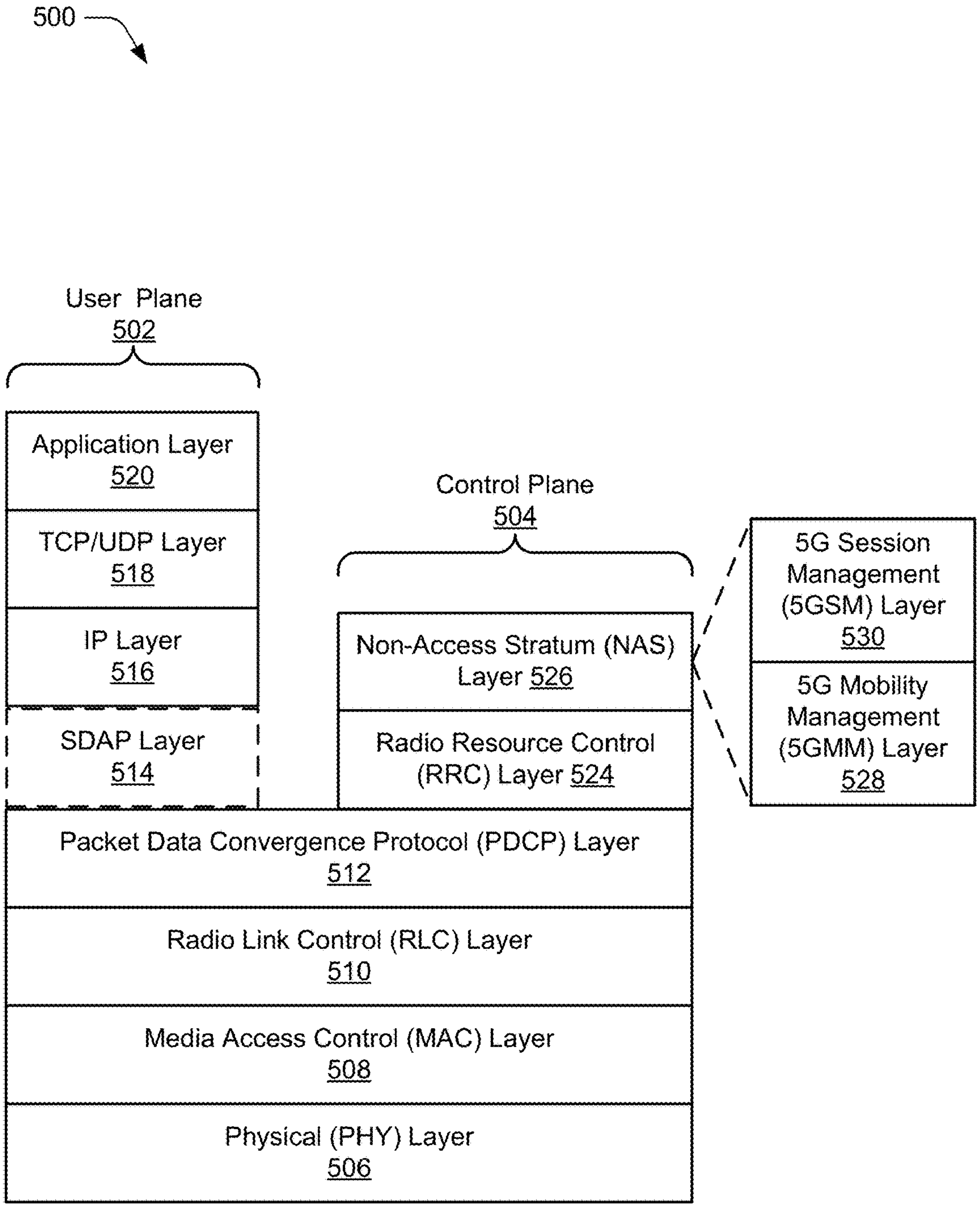
FIG. 5 illustrates an example wireless network protocol stack that can be used in accordance with one or more aspects of adaptive phase-changing devices for non-terrestrial networks.

FIG. 5 illustrates an example block diagram of a wireless network stack model 500 (network stack 500) that can be used in accordance with various aspects of adaptive phase-changing devices for non-terrestrial networks. The network stack 500 characterizes an example terrestrial and/or non-terrestrial communication system used in the example environment 100. The network stack 500 includes a user plane 502 and a control plane 504. Upper layers of the user plane 502 and the control plane 504 share common lower layers in the network stack 500. Wireless devices, such as the UE 110, the base station 120, the HAPS 160, and/or the ground station 190, implement each layer as an entity for communication with another device using the protocols defined for the layer. For example, the UE 110 uses a Packet Data Convergence Protocol (PDCP) entity to communicate to a peer PDCP entity in the base station 120 and/or the HAPS 160 using the PDCP.

The shared lower layers include a physical (PHY) layer 506, a Media Access Control (MAC) layer 508, a Radio Link Control (RLC) layer 510, and a PDCP layer 512. The PHY layer 506 provides hardware specifications for devices that communicate with each other. As such, the PHY layer 506 establishes how devices connect to each other, assists in managing how communication resources are shared among devices, and the like.

The MAC layer 508 specifies how data is transferred between devices. Generally, the MAC layer 508 provides a way in which data packets being transmitted are encoded and decoded into bits as part of a transmission protocol.

The RLC layer 510 provides data transfer services to higher layers in the network stack 500. Generally, the RLC layer 510 provides error correction, packet segmentation, and reassembly, and management of data transfers in various modes, such as acknowledged, unacknowledged, or transparent modes.

The PDCP layer 512 provides data transfer services to higher layers in the network stack 500. Generally, the PDCP layer 512 provides the transfer of user plane 502 and control plane 504 data, header compression, ciphering, and integrity protection.

Above the PDCP layer 512, the stack splits into the user plane 502 and the control plane 504. Layers of the user plane 502 include an optional Service Data Adaptation Protocol (SDAP) layer 514, an Internet Protocol (IP) layer 516, a Transmission Control Protocol/User Datagram Protocol (TCP/UDP) layer 518, and an application layer 520, which transfers data using various interfaces. The optional SDAP layer 514 is present in 5G NR networks. The SDAP layer 514 maps a Quality of Service (QOS) flow for each data radio bearer and marks QoS flow identifiers in uplink and downlink data packets for each packet data session. The IP layer 516 specifies how the data from the application layer 520 is transferred to a destination node. The TCP/UDP layer 518 is used to verify that data packets intended to be transferred to the destination node reached the destination node, using either TCP or UDP for data transfers by the application layer 520. In some implementations, the user plane 502 may also include a data services layer (not shown) that provides data transport services to transport application data, such as IP packets including web-browsing content, video content, image content, audio content, or social media content.

The control plane 504 includes a Radio Resource Control (RRC) layer 524 and a Non-Access Stratum (NAS) layer 526. The RRC layer 524 establishes and releases connections and radio bearers, broadcasts system information, or performs power control. The RRC layer 524 also controls a resource-control state of the UE 110 and causes the UE 110 to perform operations according to the resource-control state. Example resource-control states include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 or the HAPS 160 is active. In the inactive state, the connection with the base station 120 or the HAPS 160 is suspended. If the UE 110 is in the idle state, the connection with the base station 120 or the HAPS 160 is released. Generally, the RRC layer 524 supports 3GPP access but does not support non-3GPP access (e.g., WLAN communications).

The NAS layer 526 provides support for mobility management (e.g., using a Fifth-Generation Mobility Management (5GMM) layer 528) and packet data bearer contexts (e.g., using a Fifth-Generation Session Management (5GSM) layer 530) between the UE 110 and entities or functions in the core network, such as an Access and Mobility Management Function of the 5GC 151 or the like. The NAS layer 526 supports both 3GPP access and non-3GPP access.

In the UE 110, each layer in both the user plane 502 and the control plane 504 of the network stack 500 interacts with a corresponding peer layer or entity in the base station 120, the HAPS 160, a terrestrial core network entity or function, a non-terrestrial core network entity or function, a ground station, and/or a remote service, to support user applications and control operation of the UE 110 in the RAN 140.

APD Operations with Non-Terrestrial Networks

Figure 6:
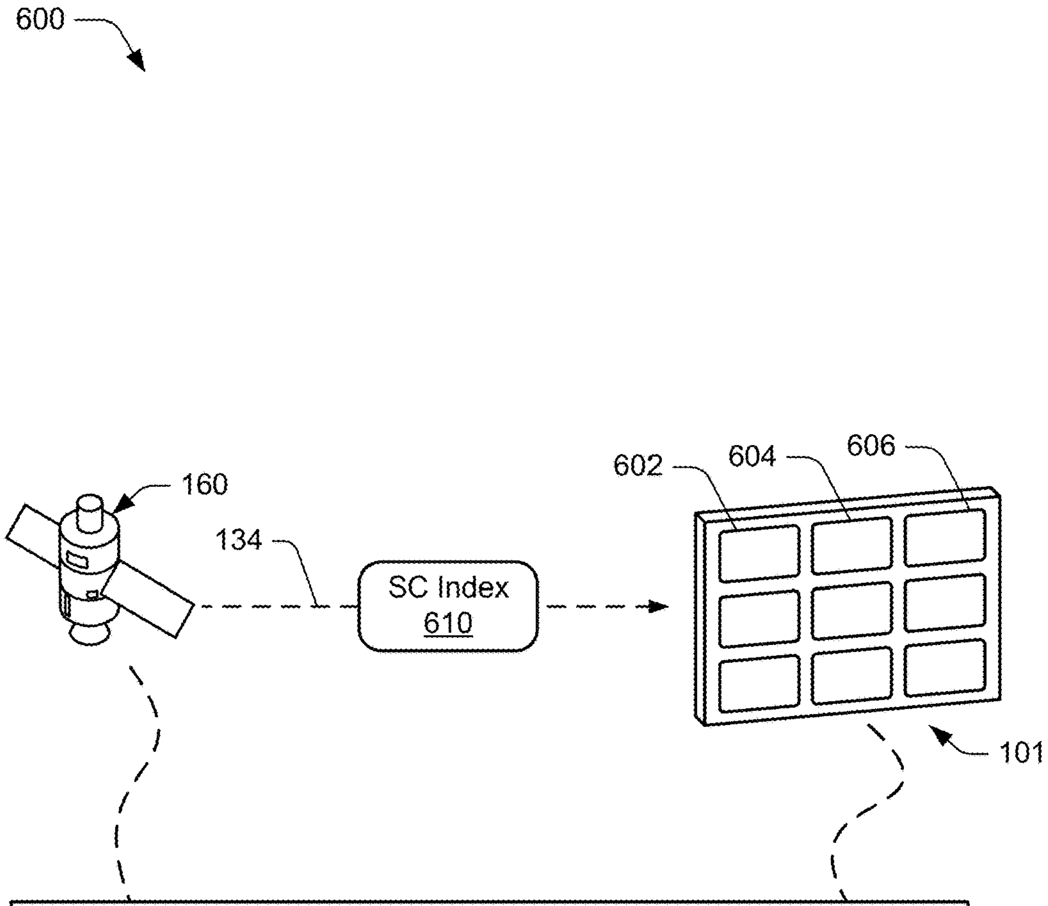
FIG. 6 illustrates an example environment in which a high altitude platform station configures an adaptive phase-changing device in accordance with various aspects of adaptive phase-changing devices for non-terrestrial networks.

FIG. 6 illustrates an example 600 of configuring an APD 101 in accordance with one or more aspects of adaptive phase-changing devices for non-terrestrial networks. The example 600 includes instances of a HAPS 160 and an APD 101, which may be implemented similarly as described with reference to FIGS. 1-4. The RIS implemented by the APD 101 includes an array of "N" configurable surface elements, such as configurable surface element 602, configurable surface element 604, configurable surface element 606, and so forth, where "N" represents the number of configurable surface elements of the RIS. For visual brevity, the example 600 shows the HAPS 160 configuring a single APD 101, but the HAPS 160 may configure additional APDs (not illustrated in FIG. 6).

In some aspects, a HAPS 160 configures the configurable surface elements of the RIS (e.g., configurable surface elements 602, 604, and 606) to direct how incident waveforms transform. For example, and with reference to FIG. 1, the HAPS 160 analyzes link-quality measurements, measurement reports, and/or other values (e.g., downlink-quality measurements, uplink-quality measurements, historical link-quality measurements) to identify channel impairments that affect a wireless link (e.g., wireless link 134) with a UE. By way of example and not of limitation, various link-quality measurements that do not meet an acceptable performance level can indicate channel impairments, such as a delay spread between a first received signal and a last received signal (e.g., received multipath rays) exceeding an acceptable delay-spread threshold, an average time-delay (of the multipath rays) exceeding an acceptable average time-delay threshold, or a reference signal receive power (RSRP) falling below an acceptable power-level threshold. Alternative or additional measurements may be monitored, such as a received signal strength indicator (RSSI), power information, signal-to-interference-plus-noise ratio (SINR) information, channel quality indicator (CQI) information, channel state information (CSI), Doppler feedback, BLock Error Rate (BLER), Quality of Service (QOS), Hybrid Automatic Repeat reQuest (HARQ) information (e.g., first transmission error rate, second transmission error rate, maximum retransmissions), uplink SINR, timing measurements, error metrics, and so on. Alternatively or additionally, the HAPS 160 analyzes historical records using UE-location information to identify channel impairments. To illustrate, the HAPS 160 may determine, from analyzing the historical data records, that the UE location corresponds to a location with a history of channel impairment(s).

In response to identifying the channel impairments, the HAPS 160 selects a surface configuration for the RIS of the APD 101 that transforms wireless signals (used to implement a wireless link) to mitigate the channel impairments and improve a received signal quality. As one example, the HAPS 160 initiates a beamforming procedure, receives RSRP measurements from a UE as part of the beamforming procedure, and selects a surface configuration corresponding to the highest RSRP value under the tested conditions.

In implementations, the HAPS 160 manages a configuration of the RIS of the APD 101 through use of a surface-configuration codebook 608, which can be preconfigured and/or known by both the HAPS 160 and the APD 101. The HAPS 160 and the APD 101 may maintain multiple surface-configuration codebooks, such as multiple surface-configuration codebooks that correspond to a respective (different) location of a (movable) APD. To illustrate, the HAPS 160 analyzes the surface-configuration codebook, which may be based on a current APD-location, to identify a surface configuration that modifies and/or transforms various signal characteristics of an incident wireless signal, such as modifying one or more desired phase characteristic(s), one or more amplitude characteristic(s), a polarization characteristic, and so forth. Thus, the HAPS 160 may first select a surface-configuration codebook based on a current APD location, then identify a surface configuration in the selected surface-configuration codebook.

In some implementations, the HAPS 160 uses historical records to select a surface configuration. For instance, the base station uses an estimated UE location to retrieve surface configurations from historical records that link geographic locations (e.g., latitude, longitude, altitude) to surface configurations that improve signal quality at the location.

In some cases, the HAPS 160 transmits a surface-configuration codebook 608 and/or a beam-sweeping codebook (or modifications to any of these codebooks) using the wireless link 134 with the APD, such as by transmitting one or more messages using a narrow-band APD-Physical Downlink Control Channel (APD-PDCCH) as described in further detail below. At times, the HAPS 160 transmits multiple surface-configuration codebooks (e.g., codebooks 416) to the APD 101, such as a first surface-configuration codebook for downlink communications, a second surface-configuration codebook for uplink communications, a phase-vector codebook, a beam-sweeping codebook, or the like. In response, the APD 101 stores the surface-configuration codebook(s) 608 and/or other codebooks in CRM, which is representative of codebook(s) 416 in CRM 412 as described with reference to FIG. 4. Alternatively or additionally, the APD 101 obtains the surface-configuration and other codebooks through manufacturing (e.g., programming), calibration, or installation processes that store the surface-configuration codebook(s) 408 and other codebooks in the CRM 412 of the APD 101 during assembly, installation, calibration, verification, or through an operator manually adding or updating the codebook(s).

The surface-configuration codebook 608 includes configuration information that specifies a surface configuration for some or all the configurable surface elements (e.g., elements 424) forming the RIS of the APD 101. Alternatively or additionally, the surface-configuration codebook 608 includes APD positioning information (e.g., azimuth and/or elevation positions for the APD/APD surface). As one example, each index of the codebook corresponds to a phase vector with configuration information for each configurable surface element of the APD 101 and/or an APD position. Index 0, for instance, maps phase configuration 0 to configurable surface element 602, phase configuration 1 to configurable surface element 604, phase configuration 2 to configurable surface element 606, and so forth. Similarly, index 1 maps phase configuration 3 to configurable surface element 602, phase configuration 4 to configurable surface element 604, phase configuration 5 to configurable surface element 606, and so forth. The surface-configuration codebook 608 can include any number of phase vectors that specify configurations for any number of configurable surface elements, such that a first phase-vector corresponds to a first surface-configuration for the APD 101 (by way of configurations for each configurable surface element in the RIS), a second phase-vector corresponds to a second surface-configuration for the APD 101, and so on. In aspects, one or more surface configurations or phase vectors may be mapped or calibrated to specific angle information of incident and/or reflective wireless signals (e.g., reference signals), signal rays, beamformed transmission of the HAPS 160, or the like. Alternatively or additionally, the surface-configuration codebook 608 includes multiple APD positions for each surface configuration (e.g., a first entry/row in the codebook corresponds to a first surface configuration at a first APD position, a second entry/row in the codebook corresponds to the first surface configuration at a second APD position).

The surface-configuration information stored in a codebook can correspond to a full configuration that specifies an exact configuration (e.g., configure with this value) or a delta configuration that specifies a relative configuration (e.g., modify a current state by this value). In one or more implementations, the phase-configuration information specifies a directional increment and/or angular adjustment between an incident signal and a transformed signal. For instance, the phase configuration 0 can specify an angular-adjustment configuration for element 602 such that the configurable surface element 602 reflects the incident waveform with a "phase configuration 0" relative angular or directional shift.

As shown in FIG. 6, the HAPS 160 communicates an indication to the APD 101 that specifies a surface configuration. In the present example, the indication specifies a surface-configuration index 610 (SC index 610) that maps to a corresponding surface configuration of the APD 101. In response to receiving the indication, the APD manager 420 retrieves the surface configuration from the surface-configuration codebook 608 using the index and applies the surface configuration to the RIS. For example, the APD manager 420 configures each configurable surface element as specified by a respective entry in the surface-configuration codebook 608.

In various implementations, the HAPS 160 communicates timing information (not shown) to the APD 101, which may be included with a surface configuration. For instance, the HAPS 160 sometimes indicates, to the APD 101 and using the wireless link 134, a start time for the application of an indicated surface configuration or beam-sweeping pattern, a stop time that indicates when the APD may remove and/or change the surface configuration, and/or a timing offset (e.g., an advance or delay from the start time) on when to start applying the indicated surface configuration. By specifying the timing information, the HAPS 160 can synchronize and/or configure the APD 101 to a particular UE (e.g., UE 110). For example, the HAPS 160 configures the APD 101 for the particular UE by specifying start times, stop times, and/or timing offsets that correspond to a time slot assigned to the particular UE and/or to compensate for estimated propagation delays. To maintain synchronized timing with the HAPS 160, the APD 101 receives and/or processes a HAPS synchronizing signal.

In aspects, the HAPS 160 transmits messages over wireless link 134 that indicate a surface configuration to the APD 101, similar to layer 2 or layer 3 control messages that communicate information using information elements (IEs). Alternatively or additionally, the HAPS 160 indicates control information using signaling for quick surface-configuration changes (e.g., surface configurations applied on a slot-by-slot basis). In aspects, the HAPS 160 transmits surface-configuration indications and/or timing information using APD-PDCCH signaling, which allows the HAPS 160 to dynamically configure the APD 101 on a slot-by-slot basis. In some aspects, the HAPS 160 transmits a surface-configuration schedule to the APD that indicates when to apply different surface configurations to the RIS/configurable surface elements. Such a surface-configuration schedule may be used to implement a reflection-beam-sweeping procedure or an incident-beam-sweeping procedure.

In aspects, the HAPS 160 assigns an identity to each APD, such as an adaptive phase-changing device radio network temporary identifier (APD-RNTI). The APD-RNTI can be shared across multiple beams of a HAPS or across multiple HAPS. For example, the HAPS 160 and the APD 101 may perform a random-access channel (RACH) procedure to establish wireless communications with one another and, as part of the RACH procedure, the HAPS 160 dynamically assigns a particular APD-RNTI to the APD 101 (e.g., the HAPS 160 assigns a unique APD-RNTI to each APD that establishes wireless communications with the HAPS).

Figure 7:
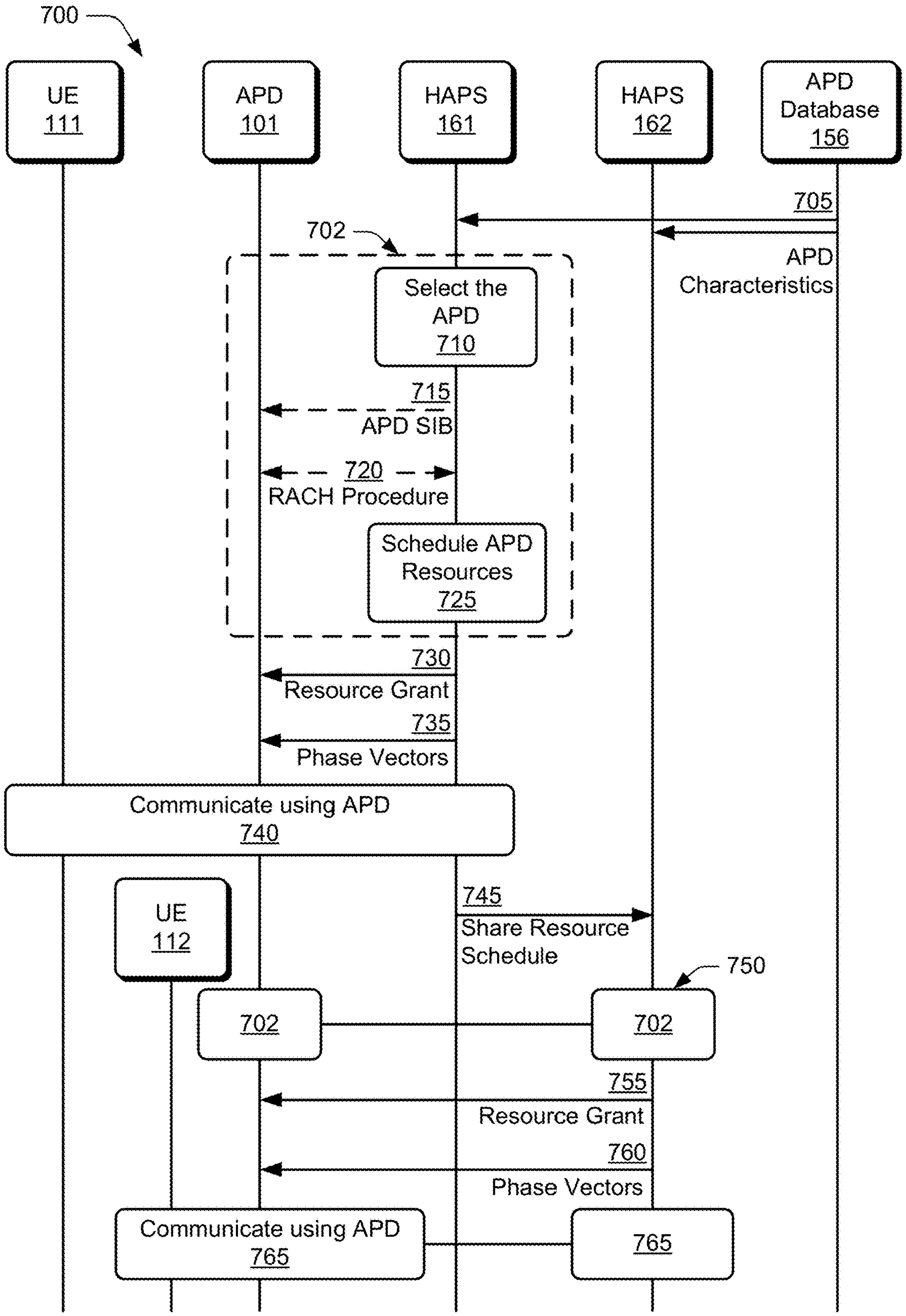
FIG. 7 illustrates an example signaling and control transaction diagram in accordance with various aspects of adaptive phase-changing devices for non-terrestrial networks.

FIG. 7 illustrates a signaling and control transaction diagram 700 that includes a combination of actions, signaling transactions, and/or control transactions that can be used to perform aspects of adaptive phase-changing devices for non-terrestrial networks. At 705, the HAPS 161 and 162 receive characteristics (capabilities) of available APDs from the APD database 156. The APD characteristics may be provisioned at the HAPS, requested by the HAPS during flight, and/or pushed by the APD database (e.g., when new APDs are added or modified). The APD database may send APD characteristics based on a geographic region served by a HAPS or along the flight path of a HAPS before a HAPS needs access to those APDs.

At 710, the HAPS 161 selects an APD 101 for inclusion in the wireless communication path with a UE (illustrated as UE 111). As described above, the HAPS 161 selects the APD 101 for inclusion in the wireless communication path based on a relatively static condition, such as a historical channel impairment that commonly occurs when the UE 111 and the HAPS 161 are in particular geographic locations, or based on the HAPS 161 determining (e.g., based on link quality measurements) that a dynamic environmental change has occurred (e.g., a cloud drifting into the communication path).

Optionally at 715, if the APD 101 does not have a statically-assigned APD-RNTI (such as an APD-RNTI assigned before the first step 705 of the method depicted in diagram 700; for example, an APD which is assigned when the APD was installed and which optionally cannot be changed), the HAPS 161 may transmit an APD SIB (system information block) that includes an indication of the bandwidth part (BWP) for the APD-PDCCH. The APD SIB may optionally also include an indication of periodicity for an APD to search for a resource grant on the APD-PDCCH as explained below. To facilitate the reception of the APD SIB by the APD, the HAPS 161 may broadcast the frequency and the timing of the APD SIB in a SIB1 (system information block Type 1).

At 720, the APD 101 performs a RACH procedure with the HAPS using the indicated BWP from event 715 that enables the HAPS 161 to obtain characteristics of the APD 101 and assign an APD-RNTI to the APD. In this manner, an APD 101 can enter into a connected state (similar to a UE RRC connected state) with a HAPS 161. The APD 101 can use the RACH procedure to convey information about the APD to the HAPS in a Message A (MsgA) or Message 3 (Msg3) of the RACH procedure. For example, the APD can communicate capabilities of the APD to the HAPS either by directly communicating the APD's capabilities or by communicating a unique identifier of the APD that can be used to retrieve the APD's capabilities from the APD database 156. In an alternative aspect, each APD 101 receives a (static) APD-RNTI assignment during a provisioning procedure.

At 725, based in part on the characteristics of the APD 101, the HAPS 161 schedules air interface resources for APD-PDCCH communication. At 730, the HAPS 161 sends a resource grant to the APD 101 including an indication of the scheduled air interface resources. The HAPS 160 may use the APD-RNTI associated with a particular APD to indicate APD-specific APD control information (e.g., surface-configuration information, timing information, location and/or movement information) to that APD. The HAPS 160, for instance, scrambles APD control information with the intended APD-RNTI and transmits the (scrambled) APD-specific APD control information using the APD-PDCCH, where the APD-PDCCH may use the same bandwidth part the HAPS uses for user-plane downlink communications to the UE 110. The respective APD assigned the particular APD-RNTI identifies the APD-PDCCH transmission and descrambles the APD control information using the APD-RNTI.

In alternatives, the APD 101 checks each slot of the received APD-PDCCH for an indication of the resource grant, the APD 101 is configured to search the APD-PDCCH at a given multi-slot periodicity (similar to idle mode discontinuous reception (DRX) for UEs), and/or the APD SIB or RACH MsgB or Msg4 can include an indication of when the APD 101 should look for a resource grant in the APD-PDCCH. At 735, the HAPS 161 sends to the APD 101 an indication of phase vectors and/or timing information using the APD-PDCCH to configure the RIS of the APD 101 for communication with the UE 111.

After a guard period, at 740, the HAPS 161 and the UE 111 communicate using the APD 101 to reflect signals between the HAPS and the UE. A (timing) guard period between the APD receiving control information (e.g., phase vectors and timing information) from the HAPS allows the APD to transition to reflecting signals between the HAPS and a UE. The length of the guard period depends on how fast the APD can switch the configuration of the RIS 422 to a configuration for reflecting communications between the HAPS and the UE. In instances where multiple HAPS at different altitudes are sharing an APD, differences in propagation times between HAPS of different altitudes may also be included in determining (calculating) the length of the guard period. The HAPS schedules air interface resources including APD-PDCCH resources for APD control and resources for reflecting signals between the HAPS and UE. Signals between the HAPS and the UE may range from synchronization signals to reference signals to Physical Broadcast Channel (PBCH), Physical Downlink Control Channel (PDCCH), Physical Downlink Shared Channel (PDSCH), Physical Uplink Control Channel (PUCCH), Physical Uplink Shared Channel (PUSCH), and/or other signals. The HAPS uses capability information for the APD in determining the scheduling of the resources to provide the guard period. For example, the guard period can be the length of the cyclic prefix of the next symbol, the guard period can be the length of one OFDM symbol, or any other suitable length.

At 745, when the HAPS 161 is sharing the APD with another HAPS 162, the HAPS 161 shares its resource schedule for the APD 101 with the other HAPS 162. After a first HAPS (e.g., HAPS 161) obtains capability information (characteristics) for the APD 101, the first HAPS can share the capability information with other HAPS (e.g., the HAPS 162 via the communication link 181). Sharing APD capability information between multiple HAPS improves the efficiency of handovers of a UE from the first HAPS to the second HAPS by eliminating the need to perform additional RACH procedures and/or additional capability lookups with the APD database 156.

Whether statically assigned or assigned during a RACH procedure, the HAPS in the NTN can also share the APD-RNTI. In one example, by sharing the APD-RNTI, a first HAPS 161 can hand over a UE 111 (e.g., a stationary or near-stationary UE) to a second HAPS 162 using the same APD 101. In another example, a first HAPS 161 can hand over a UE 111 to a second HAPS 162 using another APD (not shown).

In yet another example, the second HAPS 162 can use the same APD 101 to communicate with a different UE 112. In this further aspect, an APD can support beam reflection for multiple HAPS communicating with different UEs. The NTN allocates a time slot of APD availability to each of the multiple HAPS. For example, multiple UEs time-share a single APD to reach different HAPS or different NTNs can share the same APD using different time slots for the various NTNs. HAPS in different NTNs coordinate use of the same APD by coordinating slot allocations of the APD. Each NTN can use the same APD-RNTI for an APD (e.g., a statically assigned APD-RNTI) or different APD-RNTIs (e.g., when APD-RNTIs are assigned during RACH procedures with the different NTNs). If the HAPS in different NTNs have different orbital altitudes, control signaling timing may be affected, and a sufficient guard period between slots allocated to different HAPS avoids overlapping use of an APD in a manner that may cause interference.

As indicated at 750, the set of signaling and control transactions included in the sub-diagram 702 are performed by the HAPS 162 to schedule resources to use the APD 101 for communication with a UE (illustrated as UE 112). The HAPS 162 takes the shared resource schedule received 745 from the HAPS 161 to schedule these resources. In one option (not shown), the sharing of scheduled resources and/or APD characteristics may be used to facilitate the handover of a single UE from a first HAPS 161 to a second HAPS 162.

At 755, the HAPS 162 sends (similar to event 730) a resource grant to the APD 101 including an indication of the scheduled air interface resources. At 760, using the APD-PDCCH, the HAPS 162 sends (similar to event 735) an indication of phase vectors and/or timing information to configure the RIS of the APD 101 for communication with the UE 112. After a guard period, at 765, the HAPS 162 and the UE 112 communicate using the APD 101 to reflect signals between the HAPS and the UE (similar to event 740). Thus, the APD 101 may reflect wireless communications between the UE 111 and a HAPS 161 as well as the UE 112 and another HAPS 162 of the non-terrestrial access network.

Example Method

Figure 8:
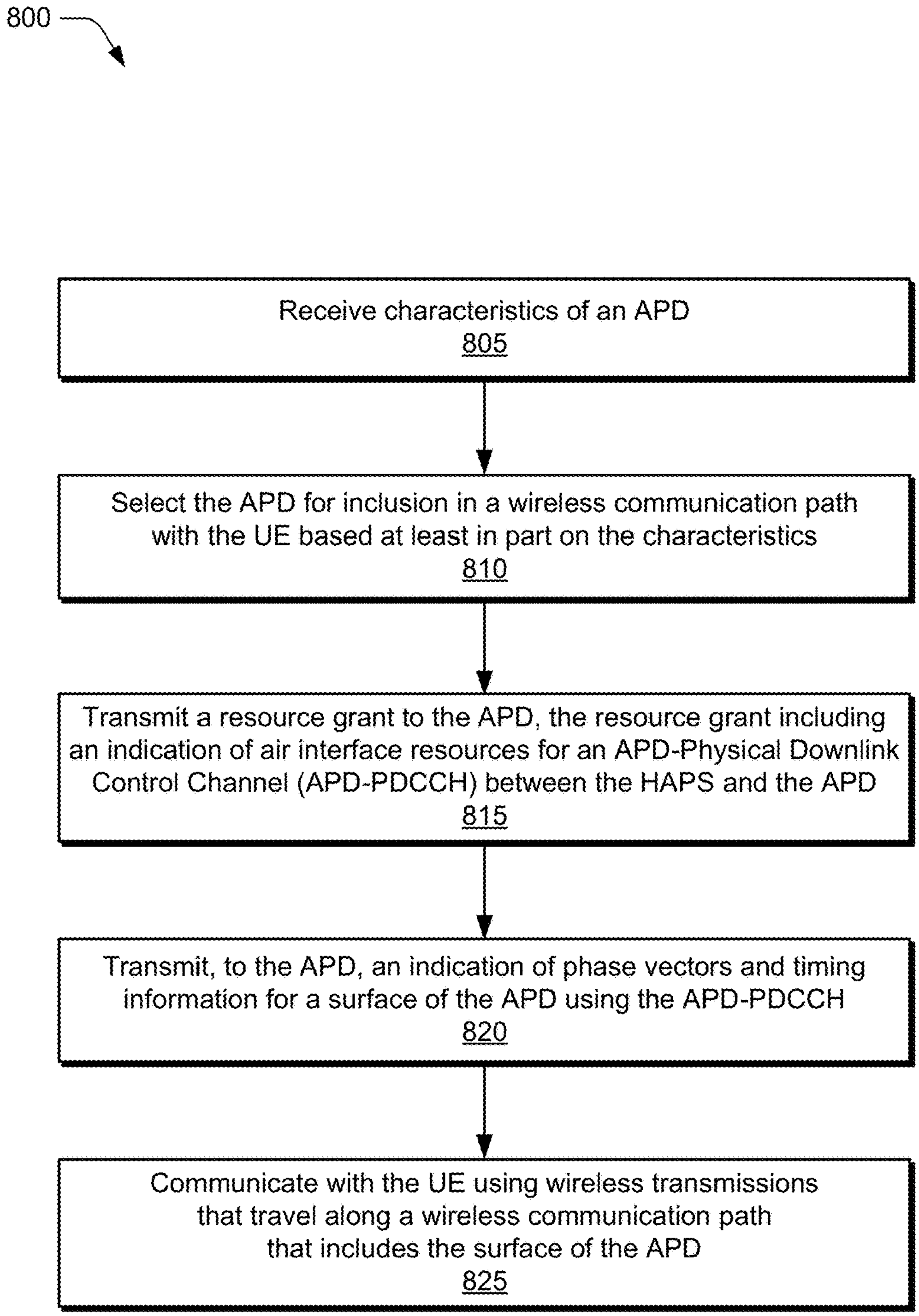
FIG. 8 illustrates an example method in accordance with various aspects of adaptive phase-changing devices for non-terrestrial networks.
Figure 9:
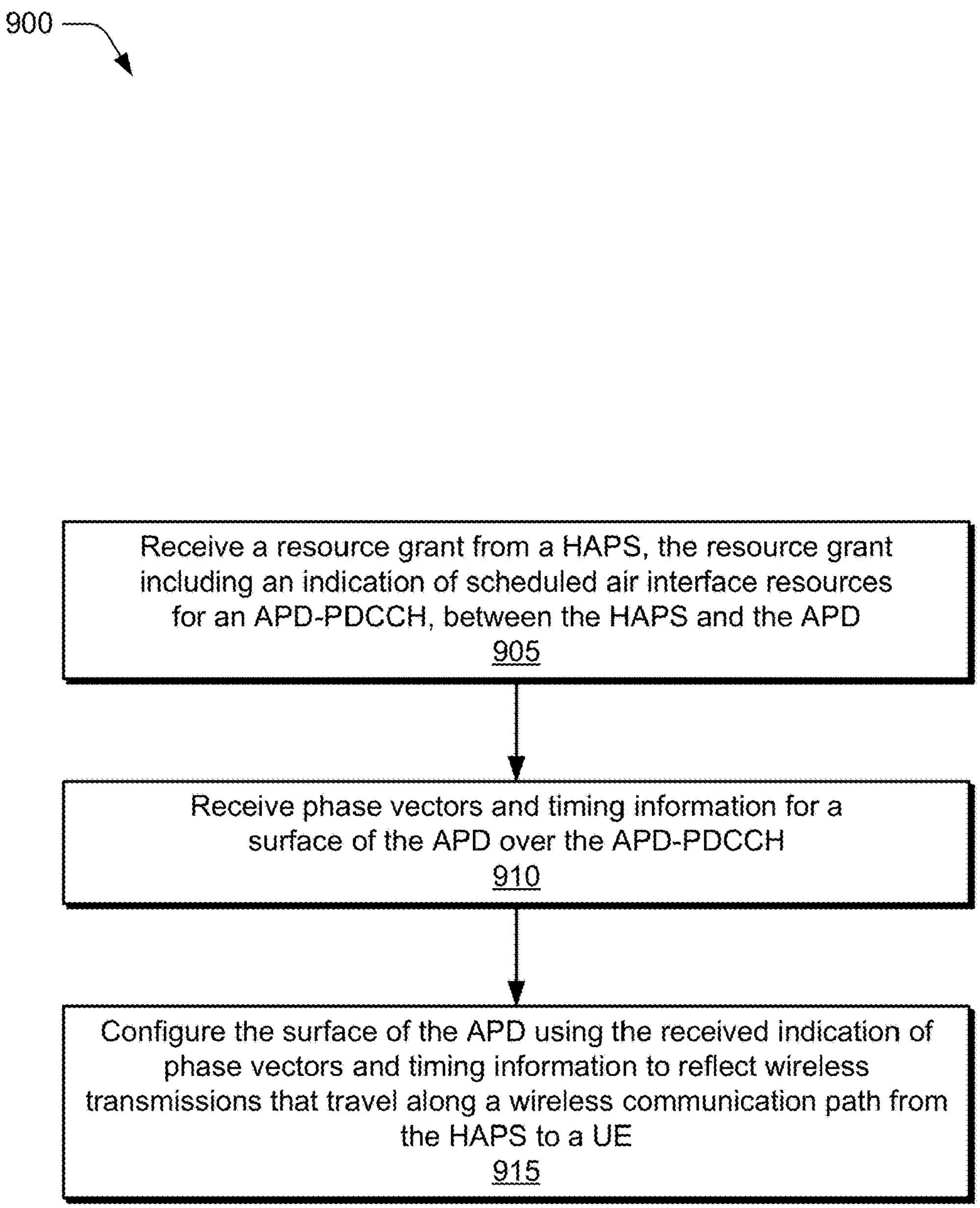
FIG. 9 illustrates an example method in accordance with various aspects of adaptive phase-changing devices for non-terrestrial networks.

FIGS. 8 and 9 illustrates example method(s) 800 and 900 of adaptive phase-changing devices for non-terrestrial networks. Example method 800 generally relates to configuring an APD by a HAPS. At 805, a HAPS (e.g., the HAPS 161) receives characteristics of an APD (e.g., the APD 101). For example, the HAPS receives characteristics of an APD from an APD database (e.g., the APD database 156) as described with respect to FIG. 7 event 705. The characteristics are associated with a unique identifier of the APD and include one or more of: a geographic location of the APD, an orientation of the APD, a minimum time for setting a new RIS, configuration of the APD, an incident angular range of the APD, a reflective angular range of the APD, an ability to subdivide an array of multiple configurable surface elements of a RIS panel to enable multiple UEs to communicate with the NTN using the RIS panel, and/or how much the array of multiple configurable surface elements of the RIS panel can be subdivided.

At 810, the HAPS selects the APD for inclusion in a wireless communication path with a UE (e.g., the UE 110)

based at least in part on the characteristics of the APD. For example, based on the received characteristics and other information, such as a geographic location of the HAPS, a geographic location of the UE, or a change in channel conditions between the HAPS and the UE, the HAPS selects the APD for inclusion in a wireless communication path with a UE as shown by FIG. 7 event 710.

At 815, the HAPS transmits a resource grant to the APD, the resource grant including an indication of air interface resources for an APD-Physical Downlink Control Channel (APD-PDCCH) between the HAPS and the APD. For example, the HAPS transmits a resource grant to the APD that indicates when the HAPS will transmit control information to the APD as shown in FIG. 7 event 725, 730, 755.

At 820, the HAPS transmits, to the APD, an indication of phase vectors and timing information for a surface of the APD using the APD-PDCCH. For example, the HAPS transmits control information to configure a RIS (e.g., RIS 422) for communication between the HAPS and the UE as described with FIG. 7 events 735, 760.

At 825, the HAPS communicates with the UE using wireless transmissions that travel along the wireless communication path that includes reflecting wireless transmissions using the surface of the APD. See FIG. 7 event 740, 765.

Example method 900 generally relates to configuring an APD. At 905, an APD (e.g., the APD 101) receives a resource grant from a HAPS (e.g., the HAPS 161) that includes an indication of scheduled air interface resources for an APD-PDCCH between the HAPS and APD. For example, the APD receives the resource grant as shown in FIG. 7 event 730, 755 in the same BWP that the HAPS and a UE (e.g., the UE 110) will use for communication.

At 910, the APD receives phase vectors and timing information for a surface of the APD over the APD-PDCCH. For example, the APD receives phase vectors and timing information as shown in FIG. 7 event 735, 760 that indicate a configuration that the APD will apply to a RIS (e.g., RIS 422) and the timing during which to apply the configuration indicated by the phase vectors. The HAPS may indicate the configuration (or sequence of configurations) using one or more SC indices 610 as shown in FIG. 6.

At 915, the APD configures the surface of the APD using the received indication of phase vectors and timing information to reflect wireless transmissions that travel along a wireless communication path 134 from the HAPS to the UE. For example, the HAPS applies the configuration indicated by the phase vectors to the RIS at the time indicated by the timing information to reflect the wireless signals 134 between the HAPS and the UE.

Example methods 800 and 900 are described with reference to FIGS. 8 and 9 in accordance with one or more aspects of adaptive phase-changing devices for non-terrestrial networks. The order in which the method blocks are described are not intended to be construed as a limitation, and any number of the described method blocks can be skipped, repeated, or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

In the following some examples are described:

Example 1: A method performed by a high altitude platform station, HAPS, for communicating with a user equipment, UE, using an adaptive phase-changing device, APD, the method comprising:
- receiving characteristics of the APD;
- selecting the APD for inclusion in a wireless communication path with the UE based at least in part on the characteristics of the APD;
- transmitting a resource grant to the APD, the resource grant including an indication of air interface resources for an APD-Physical Downlink Control Channel, APD-PDCCH, between the HAPS and the APD;
- transmitting, to the APD, an indication of phase vectors and timing information for a surface of the APD using the APD-PDCCH; and
- communicating with the UE using wireless transmissions that travel along the wireless communication path that includes the surface of the APD.

Example 2: The method of example 1, further comprising:
- determining the phase vectors and timing information based on one or more of:
- the received characteristics of the APD;
- a geographic location of the HAPS;
- a velocity of the HAPs;
- a flight path of the HAPS;
- a geographic location of the UE; or
- an orientation of the UE.

Example 3: The method of example 2, wherein the determining the phase vectors and timing information based on the received characteristics of the APD comprises:
- calculating a guard time between an end of the transmitting the phase vectors and the timing information using the APD-PDCCH and a beginning of the communicating with the UE, the guard time being determined at least in part on the received characteristics of the APD.

Example 4: The method of any one of the preceding examples, wherein the receiving the characteristics of the APD comprises:
- receiving at a first portion of the characteristics of the APD during a Random Access Channel, RACH, procedure with the APD.

Example 5: The method of example 4, further comprising:
- assigning an APD-Radio Network Temporary Identifier, APD-RNTI, to the APD.

Example 6: The method of example 4 or 5, wherein the first portion of the characteristics of the APD includes a unique identifier of the APD, the method further comprising:
- using the unique identifier to obtain a second portion of the characteristics from an APD database.

Example 7: The method of any of examples 1-6, further comprising:
- transmitting an APD-System Information Block, APD-SIB, that includes an indication of a bandwidth part, BWP, for the APD-PDCCH.

Example 8: The method of example 7, further comprising:
broadcasting a System Information Block Type 1 (SIB1) that includes frequency and timing information for the transmission of the APD-SIB.

Example 9: The method of any one of examples 1 to 3, wherein the receiving the characteristics of the APD comprises:
receiving a statically-assigned APD-RNTI in the received characteristics of the APD.

Example 10: The method of any one of examples 1 to 3, wherein the receiving the characteristics of the APD comprises:
receiving the characteristics from an APD database.

Example 11: The method of any one of the preceding examples, wherein the selecting the APD for inclusion in the wireless communication path with the UE comprises:
including the APD based on one or more of:
a geographic location of the HAPS;
a geographic location of the UE;
the characteristics of the APD;
a change in channel conditions between the HAPS and the UE; or
the APD having been used by another HAPS in a prior wireless communication path with the UE.

Example 12: The method of any one of the preceding examples, wherein the characteristics include one or more of:
a geographic location of the APD;
an orientation of the APD;
a minimum time for setting a new Reconfigurable Intelligent Surface, RIS, configuration of the APD;
an incident angular range of the APD;
a reflective angular range of the APD;
an ability to subdivide a RIS panel; or
how much the RIS panel can be subdivided.

Example 13: A high altitude platform station, HAPS, comprising:
a wireless transceiver;
a processor; and
instructions for a HAPS communication manager application that are executable by the processor to configure the HAPS to perform any one of the methods of the preceding examples.

Example 14: The HAPS of example 13, wherein the HAPS is:
a low earth orbit, LEO, satellite;
a medium earth orbit, MEO, satellite;
a geostationary earth orbit, GEO, satellite;
a highly elliptical orbiting, HEO, satellite;
an airborne vehicle platform;
a high-altitude communication platform; or
an uncrewed aerial vehicle-based, UAV-based, communication platform.

Example 15: A method performed by an adaptive phase-changing device, APD, the method comprising:
receiving a resource grant from a high altitude platform station, HAPS, the resource grant including an indication of scheduled air interface resources for an APD-Physical Downlink Control Channel, APD-PDCCH, between the HAPS and the APD;
receiving an indication of phase vectors and timing information for a surface of the APD over the APD-PDCCH; and
configuring the surface of the APD using the received indication of phase vectors and timing information to reflect wireless transmissions that travel along a wireless communication path from the HAPS to a User Equipment, UE, including the surface of the APD.

Example 16: The method of example 15, further comprising:
initiating a Random Access Channel, RACH, procedure with the HAPS; and
based on initiating the RACH procedure, receiving an assignment of an APD-Radio Network Temporary Identifier, APD-RNTI, from the HAPS.

Example 17: The method of example 15 or 16, further comprising:
receiving, from the HAPS, an APD-System Information Block, APD-SIB, that includes an indication of a bandwidth part, BWP, for the APD-PDCCH.

Example 18: The method of example 17, further comprising:
receiving a System Information Block Type 1 (SIB1) that includes frequency and timing information for the receiving the APD-SIB.

Example 19: The method of example 17 or 18, further comprising:
searching the APD-PDCCH for an indication of the resource grant:
at each slot of the APD-PDCCH;
at a given multi-slot periodicity; or
in response to an indication in a RACH message.

Example 20: An adaptive phase-changing device, APD, comprising:
a wireless transceiver;
one or more reconfigurable intelligent surfaces, RIS;
a processor; and
instructions for an APD manager application that are executable by the processor to configure the APD to perform any one of the methods of examples 15 to 19.

Example 21: A computer-readable medium comprising instructions that, when executed by a processor, cause an apparatus comprising the processor to perform any of the methods of examples 1 to 12 and 15 to 19.

Although aspects of adaptive phase-changing devices for non-terrestrial networks have been described in language specific to features and/or methods, the subject matter of this disclosure is not necessarily limited to the specific features or operations described. Rather, the specific features and methods are disclosed as example implementations of adaptive phase-changing devices for non-terrestrial networks, and other equivalent features and operations are intended to be within the scope of the described subject matter. It is to be appreciated that each described aspect can be implemented independently or in connection with one or more other described aspects.

What is claimed is:

1. A method performed by a high altitude platform station (HAPS) for communicating with a user equipment (UE), using an adaptive phase-changing device (APD), the method comprising:
receiving characteristics of the APD;
wherein the characteristics include one or more of:
a minimum time for setting a new Reconfigurable Intelligent Surface (RIS), configuration of the APD;
an incident angular range of the APD;
a reflective angular range of the APD;
an ability to subdivide a RIS panel; or
how much the RIS panel can be subdivided;

selecting the APD for inclusion in a wireless communication path with the UE based at least in part on the characteristics of the APD;

transmitting a resource grant to the APD, the resource grant including an indication of air interface resources for an APD-Physical Downlink Control Channel (APD-PDCCH) between the HAPS and the APD;

transmitting, to the APD, an indication of phase vectors and timing information for a surface of the APD using the APD-PDCCH; and communicating with the UE using wireless transmissions that travel along the wireless communication path that includes the surface of the APD.

2. The method of claim 1, further comprising:

after receiving characteristics of the APD, sharing the characteristics of the APD with one or more other HAPS, whereby APD capability is shared for use in handovers of the UE from the HAPS to one of the one or more other HAPS.

3. The method of claim 1, further comprising:

determining the phase vectors and timing information based on the received characteristics of the APD.

4. The method of claim 3, wherein the determining the phase vectors and timing information based on the received characteristics of the APD comprises:

calculating a guard time between an end of the transmitting the phase vectors and the timing information using the APD-PDCCH and a beginning of the communicating with the UE, the guard time being determined at least in part on the received characteristics of the APD.

5. The method of claim 1, wherein the receiving the characteristics of the APD comprises:

receiving at a first portion of the characteristics of the APD during a Random Access Channel (RACH) procedure with the APD.

6. The method of claim 5, further comprising:

assigning an APD-Radio Network Temporary Identifier (APD-RNTI) to the APD, and optionally wherein the first portion of the characteristics of the APD includes a unique identifier of the APD and the method further comprises:

using the unique identifier to obtain a second portion of the characteristics from an APD database.

7. The method of claim 1, further comprising:

transmitting an APD-System Information Block (APD-SIB) that includes an indication of a bandwidth part (BWP) for the APD-PDCCH, and optionally further comprising:

broadcasting a System Information Block Type 1 (SIB1) that includes frequency and timing information for the transmission of the APD-SIB.

8. The method of claim 1, wherein the receiving the characteristics of the APD comprises:

receiving a statically-assigned APD-RNTI in the received characteristics of the APD.

9. The method of claim 1, wherein the selecting the APD for inclusion in the wireless communication path with the UE comprises:

including the APD based on a geographic location of the APD.

10. A high altitude platform station, HAPS (161), comprising:

a wireless transceiver;

a processor; and instructions for a HAPS communication manager application that are executable by the processor to configure the HAPS to:

receive characteristics of an adaptive phase-changing device (APD);

wherein the characteristics include one or more of:

a minimum time for setting a new Reconfigurable Intelligent Surface (RIS) configuration of the APD;

an incident angular range of the APD;

a reflective angular range of the APD;

an ability to subdivide a RIS panel; or how much the RIS panel can be subdivided;

select the APD for inclusion in a wireless communication path with a user equipment (UE) based at least in part on the characteristics of the APD;

transmit a resource grant to the APD, the resource grant including an indication of air interface resources for an APD-Physical Downlink Control Channel (APD-PDCCH) between the HAPS and the APD;

transmit, to the APD, an indication of phase vectors and timing information for a surface of the APD using the APD-PDCCH; and communicate with the UE using wireless transmissions that travel along the wireless communication path that includes the surface of the APD.

11. A method performed by an adaptive phase-changing device, APD, the method comprising:

receiving a resource grant from a high altitude platform station (HAPS), the resource grant including an indication of scheduled air interface resources for an APD-Physical Downlink Control Channel (APD-PDCCH) between the HAPS and the APD;

receiving an indication of phase vectors and timing information for a surface of the APD over the APD-PDCCH; and configuring the surface of the APD using the received indication of phase vectors and timing information to reflect wireless transmissions that travel along a wireless communication path from the HAPS to a user equipment (UE), including the surface of the APD.

12. The method of claim 11, further comprising:

initiating a Random Access Channel (RACH) procedure with the HAPS; and based on initiating the RACH procedure, receiving an assignment of an APD-Radio Network Temporary Identifier (APD-RNTI) from the HAPS.

13. The method of claim 11, further comprising:

receiving, from the HAPS, an APD-System Information Block (APD-SIB) that includes an indication of a bandwidth part (BWP) for the APD-PDCCH.

14. The method of claim 13, further comprising:

receiving a System Information Block Type 1 (SIB1) that includes frequency and timing information for the receiving the APD-SIB, and optionally further comprising:

searching the APD-PDCCH for an indication of the resource grant:

at each slot of the APD-PDCCH;

at a given multi-slot periodicity; or in response to an indication in a RACH message.

15. An adaptive phase-changing device (APD), comprising:

a wireless transceiver;

one or more reconfigurable intelligent surfaces, RIS;

a processor; and instructions for an APD manager application that are executable by the processor to configure the APD to:

receive a resource grant from a high altitude platform station (HAPS), the resource grant including an indication of scheduled air interface resources for an APD-Physical Downlink Control Channel (APD-PDCCH) between the HAPS and the APD;

receive an indication of phase vectors and timing information for a surface of the APD over the APD-PDCCH; and configure the surface of the APD using the received indication of phase vectors and timing information to reflect wireless transmissions that travel along a wireless communication path from the HAPS to a user equipment (UE), including the surface of the APD.

16. The APD of claim 15, the instructions executable to configure the APD to:

initiate a Random Access Channel (RACH) procedure with the HAPS; and based on the initiation of the RACH procedure, receive an assignment of an APD-Radio Network Temporary Identifier (APD-RNTI) from the HAPS.

17. The APD of claim 15, the instructions executable to configure the APD to:

receive, from the HAPS, an APD-System Information Block (APD-SIB) that includes an indication of a bandwidth part (BWP) for the APD-PDCCH.

18. The HAPS of claim 10, the instructions executable to configure the HAPS to:

after reception of the characteristics of the APD, share the characteristics of the APD with one or more other HAPS, whereby APD capability is shared for use in handovers of the UE from the HAPS to one of the one or more other HAPS.

19. The HAPS of claim 10, the instructions executable to configure the HAPS to:

determine the phase vectors and timing information based on the received characteristics of the APD.

20. The HAPS of claim 19, wherein the instructions to determine the phase vectors and timing based on the received characteristics of the APD are executable to configure the HAPS to:

calculate a guard time between an end of the transmission of the phase vectors and the timing information using the APD-PDCCH and a beginning of the communication with the UE, the guard time being determined at least in part on the received characteristics of the APD.

* * * * *